(12) United States Patent
Huang et al.

(10) Patent No.: US 12,309,355 B2
(45) Date of Patent: May 20, 2025

(54) ADAPTIVELY CODING MOTION INFORMATION FOR MULTIPLE HYPOTHESIS PREDICTION FOR VIDEO CODING

(71) Applicant: QUALCOMM Incorporated, San Diego, CA (US)

(72) Inventors: Han Huang, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 264 days.

(21) Appl. No.: 17/655,919

(22) Filed: Mar. 22, 2022

(65) Prior Publication Data

US 2022/0311997 A1    Sep. 29, 2022

Related U.S. Application Data

(60) Provisional application No. 63/167,480, filed on Mar. 29, 2021.

(51) Int. Cl.
*H04N 19/105* (2014.01)
*H04N 19/132* (2014.01)
(Continued)

(52) U.S. Cl.
CPC ......... *H04N 19/105* (2014.11); *H04N 19/132* (2014.11); *H04N 19/159* (2014.11); *H04N 19/176* (2014.11); *H04N 19/70* (2014.11)

(58) Field of Classification Search
CPC .. H04N 19/105; H04N 19/132; H04N 19/159; H04N 19/52; H04N 19/70
See application file for complete search history.

(56) References Cited

U.S. PATENT DOCUMENTS

2019/0230376 A1    7/2019  Hu et al.
2019/0379901 A1*  12/2019  Chiang ............... H04N 19/105
(Continued)

FOREIGN PATENT DOCUMENTS

WO    WO-2020084508 A1 *  4/2020    ........... H04N 19/105
WO       2020098653 A1       5/2020
(Continued)

OTHER PUBLICATIONS

"Weighted Multi-Hypothesis Inter Prediction for Video Coding"—Winken et al., 978-1-7281-4704-8/19/$31.00 A© 2019 IEEE (Year: 2019).*
(Continued)

*Primary Examiner* — Mainul Hasan
(74) *Attorney, Agent, or Firm* — Shumaker & Sieffert, P.A.

(57) ABSTRACT

An example device for decoding video data includes one or more processors configured to: generate a first prediction block for a current block of video data using a base inter-prediction mode; code a merge mode syntax element for a second prediction block representing an additional prediction hypothesis, the merge mode syntax element indicating whether motion information for the second prediction block is coded using merge mode; code the motion information for the second prediction block according to the merge mode syntax element, wherein to code the motion information, the one or more processors are configured to form a merge candidate list including merge candidates representing respective sets of uni-prediction motion information; generate the second prediction block for the current block of video data using the motion information; form a multi-hypothesis prediction block from the first and second prediction blocks; and decode the current block using the multi-hypothesis prediction block.

38 Claims, 7 Drawing Sheets

(51) Int. Cl.
*H04N 19/159* (2014.01)
*H04N 19/176* (2014.01)
*H04N 19/70* (2014.01)

(56) References Cited

U.S. PATENT DOCUMENTS

| | | | |
|---|---|---|---|
| 2020/0029073 A1 | 1/2020 | Chiang et al. | |
| 2020/0120339 A1 | 4/2020 | Chiang et al. | |
| 2020/0195948 A1 | 6/2020 | Li et al. | |
| 2020/0267406 A1 | 8/2020 | Chang et al. | |
| 2020/0275112 A1* | 8/2020 | Chiang | H04N 19/107 |
| 2020/0366924 A1 | 11/2020 | Rusanovskyy et al. | |
| 2020/0374528 A1 | 11/2020 | Huang et al. | |
| 2021/0006790 A1* | 1/2021 | Zhang | H04N 19/139 |
| 2021/0227209 A1* | 7/2021 | Liu | H04N 19/583 |
| 2021/0227245 A1* | 7/2021 | Liu | H04N 19/132 |
| 2021/0235072 A1 | 7/2021 | Ko et al. | |
| 2021/0344909 A1 | 11/2021 | Liu et al. | |
| 2022/0086429 A1 | 3/2022 | Ko et al. | |
| 2022/0224897 A1* | 7/2022 | Zhang | H04N 19/105 |
| 2023/0336713 A1 | 10/2023 | Huang et al. | |
| 2024/0251109 A1* | 7/2024 | Leleannec | H04N 19/105 |

FOREIGN PATENT DOCUMENTS

| | | | | |
|---|---|---|---|---|
| WO | WO-2020132168 A1 * | 6/2020 | | H04N 19/105 |
| WO | 2020233600 A1 | 11/2020 | | |

OTHER PUBLICATIONS

"Multi-Hypothesis Prediction Based On Implicit Motion Vector Derivation for Video Coding"—Zhao et al., 978-1-4799-7061-2/18/ $31.00 A© 2018 IEEE (Year: 2018).*
Hsu C.W., et al., "Description of Core Experiment 10 (CE10): Combined and Multi-Hypothesis Prediction", 11. JVET Meeting, Jul. 11, 2018-Jul. 18, 2018, Ljubljana, (The Joint Video Exploration Team of ISO/IEC JTC1/SC29/WG11 and ITU-T SG. 16 ), No. JVET-K1030, Jul. 18, 2018, XP030200060, 8 Pages.
International Search Report and Written Opinion—PCT/US2022/071289—ISA/EPO—Jun. 21, 2022, 12 Pages.
Winken (Fraunhofer) M., et al., "Multi-Hypothesis Inter Prediction", 122. MPEG Meeting, Apr. 16, 2018-Apr. 20, 2018, San Diego, Motion Picture Expert Group or ISO/IEC JTC1/SC29/WG11), No. m42373, Apr. 13, 2018, XP030261629, 8 Pages.
Coban M., et al., "Algorithm Description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.
Huang H., et al., "Non-EE2: On the Maximum Number of MHP Merge Candidates", JVET-Z0127-v1, Joint Video Experts Team (JVET) of ITU-T SG 16 WP 3 and ISO/IEC JTC 1/SC 29, 26th Meeting, by Teleconference, Apr. 20-29, 2022, pp. 1-2.
Chang Y-J., et al., "Compression Efficiency Methods Beyond VVC", Joint Video Experts Team (JVET) of ITU-T SG 16 WP 3 and ISO/IEC JTC 1/SC 29, JVET-U0100, 133. MPEG Meeting, 21st Meeting, by teleconference, Jan. 6-15, 2021 , Jan. 11, 2021-Jan. 15, 2021, Online, (Motion Picture Expert Group or ISO/IEC JTC1/SC29/WG11), No. m55890, Dec. 31, 2020 (Dec. 31, 2020), XP030290689, XP030293237, pp. 1-13, Retrieved from the Internet: URL: https://dms.mpeg.expert/doc_end_user/documents/133_Teleconference/wg11/m55890-JVET-U0100-v1-JVET-U0100.zip.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Seregin V., et al., "CE4-3.1a and CE4-3.1b: Unidirectional Local Illumination Compensation with Affine Prediction", Joint Video Experts Team (JVET) of ITU-T SG 16 WP 3 and ISO/IEC JTC 1/SC 29/WG 11, JVET-O0066-v1, 15th Meeting, Gothenburg, SE, Jul. 3-12, 2019, pp. 1-5.
Winken M., et al., "CE10: Multi-Hypothesis Inter Prediction (Test 10.1.2)", JVET-M0425-v2, Joint Video Experts Team (JVET) of ITU-T SG 16 WP 3 and ISO/IEC JTC 1/SC 29/WG 11, 13th Meeting: Marrakech, MA, Jan. 9-18, 2019, pp. 1-14.
Winken M., et al., "CE10: Multi-Hypothesis Inter Prediction (Tests 1.2.a—1.2.c)", JVET-L0148-v3, Joint Video Experts Team (JVET) of ITU-T SG 16 WP 3 and ISO/IEC JTC 1/SC 29/WG 11, 12th Meeting: Macao, CN, Oct. 3-12, 2018, pp. 1-12.
Winken M., et al., "CE10: Multi-Hypothesis Inter Prediction (Tests 1.5—1.8)", JVET-K0269-v1, Joint Video Experts Team (JVET) of ITU-T SG 16 WP 3 and ISO/IEC JTC 1/SC 29/WG 11, 11th Meeting: Ljubljana, SI, Jul. 10-18, 2018, pp. 1-14.
Winken M., et al., "Multi-Hypothesis Inter Prediction", 10. JVET Meeting, Apr. 10, 2018-Apr. 20, 2018, San Diego, (The Joint Video Experts Team of ISO/IEC JTC1/SC29/WG11 and ITU-T SG 16 WP 3 ), URL: http://phenix.int-evry.fr/jvet/, No. JVET-J0041-v1, Apr. 3, 2018 (Apr. 3, 2018), XP030151214, 8 Pages, abstract, sections 1-3.
Bross B., et al., "Versatile Video Coding (Draft 10)", 19. JVET Meeting, Jun. 22, 2020-Jul. 1, 2020, Teleconference, (The Joint Video Experts Team of ISO/IEC JTC1/SC29/WG11 and ITU-T SG.16), No. JVET-S2001vH, Sep. 4, 2020, 551 Pages, XP030289618.
Vadim S., "CABACReader . cpp", ECM4.0, Feb. 14, 2022, XP093050382.
Winken M., et al., "Multi-Hypothesis Inter Prediction", JVET-J0041-v2, Joint Video Experts Team (JVET) of ITU-T SG 16 WP 3 and ISO/IEC JTC 1/SC 29/WG 11, 10th Meeting: San Diego, US, Apr. 10-20, 2018, pp. 1-10.
Winken M., et al., "Multi-Hypothesis Inter Prediction", Joint Video Experts Team (JVET) of ITU-T SG 16 WP 3 and ISO/IEC JTC 1/SC 29/WG 11, 10th Meeting: JVET- J0041-V1, San Diego, US, Apr. 10-20, 2018, pp. 1-8.

* cited by examiner

| Merge Index | $L_0$ Motion Vector | $L_1$ Motion Vector |
| --- | --- | --- |
| 0 | X | |
| 1 | | X |
| 2 | X | |
| 3 | | X |
| 4 | X | |

FIG. 2

ADAPTIVELY CODING MOTION INFORMATION FOR MULTIPLE HYPOTHESIS PREDICTION FOR VIDEO CODING

This application claims the benefit of U.S. Provisional Application No. 63/167,480, filed Mar. 29, 2021, the entire contents of which are incorporated by reference herein.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1), developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for multiple hypothesis inter-prediction during video coding. Video coding generally includes partitioning pictures of a series of pictures into respective blocks, then coding (encoding or decoding) each of the blocks. Coding a block generally includes predicting the block and coding a residual for the block, that is, a set of differences between the predicted block and the actual block. Prediction can be intra-picture (that is, predicting the current block using data of the picture including the block) or inter-picture (that is, predicting the current block using data of one or more previously coded pictures). Multiple hypothesis inter-prediction refers to using multiple reference blocks in one or more previously coded pictures to predict a current block. For example, a video coder may generate two or more prediction blocks, then combine values of the prediction blocks using averaging, weighted prediction, or the like.

Inter-prediction may be signaled using various coding modes, such as merge mode or advanced motion vector prediction (AMVP) mode. In general, in merge mode, motion information of a signaled neighboring block is used as motion information of a current block, whereas in AMVP mode, motion information of a signaled neighboring block is used to predict a motion vector of the current block, and other motion information (e.g., motion vector difference values and reference picture identifying information) is coded to form the motion information of the current block. This disclosure describes, inter alia, various examples of techniques related to signaling multi-hypothesis inter-prediction information using merge mode.

In one example, a method of decoding video data includes generating a first prediction block for a current block of video data using a base inter-prediction mode; coding a merge mode syntax element for a second prediction block, the second prediction block representing an additional prediction hypothesis for the current block, wherein the merge mode syntax element indicates whether motion information for the second prediction block is coded using merge mode; coding motion information for the second prediction block according to the merge mode syntax element, including, when the merge mode syntax element indicates that the motion information for the second prediction block is coded using merge mode, forming a merge candidate list including one or more merge candidates, each of the merge candidates representing respective sets of uni-prediction motion information; generating the second prediction block for the current block of video data using the motion information; forming a multi-hypothesis prediction block for the current block as a combination of the first prediction block and the second prediction block; and decoding the current block using the multi-hypothesis prediction block.

In another example, a device for decoding video data includes a memory configured to store video data; and one or more processors implemented in circuitry and configured to: generate a first prediction block for a current block of video data using a base inter-prediction mode; code a merge mode syntax element for a second prediction block, the second prediction block representing an additional prediction hypothesis for the current block, wherein the merge mode syntax element indicates whether motion information for the second prediction block is coded using merge mode; code motion information for the second prediction block according to the merge mode syntax element, wherein to code the motion information, the one or more processors are configured to, when the merge mode syntax element indicates that the motion information for the second prediction block is coded using merge mode, form a merge candidate list including one or more merge candidates, each of the merge candidates representing respective sets of uni-prediction motion information; generate the second prediction block for the current block of video data using the motion information; form a multi-hypothesis prediction block for the current block as a combination of the first prediction block and the second prediction block; and decode the current block using the multi-hypothesis prediction block.

In another example, a computer-readable storage medium has stored thereon instructions that, when executed, cause a processor to: generate a first prediction block for a current block of video data using a base inter-prediction mode; code a merge mode syntax element for a second prediction block, the second prediction block representing an additional prediction hypothesis for the current block, wherein the merge mode syntax element indicates whether motion information for the second prediction block is coded using merge mode; code motion information for the second prediction block according to the merge mode syntax element, including, when the merge mode syntax element indicates that the motion information for the second prediction block is coded using merge mode, forming a merge candidate list including one or more merge candidates, each of the merge candidates representing respective sets of uni-prediction motion information; generate the second prediction block for the current block of video data using the motion information; form a multi-hypothesis prediction block for the current block as a combination of the first prediction block and the second prediction block; and decode the current block using the multi-hypothesis prediction block.

In another example, a device for decoding video data includes means for generating a first prediction block for a current block of video data using a base inter-prediction mode; means for coding a merge mode syntax element for a second prediction block, the second prediction block representing an additional prediction hypothesis for the current block, wherein the merge mode syntax element indicates whether motion information for the second prediction block is coded using merge mode; means for coding motion information for the second prediction block according to the merge mode syntax element, including means for forming, when the merge mode syntax element indicates that the motion information for the second prediction block is coded using merge mode, a merge candidate list including one or more merge candidates, each of the merge candidates representing respective sets of uni-prediction motion information; means for generating the second prediction block for the current block of video data using the motion information; means for forming a multi-hypothesis prediction block for the current block as a combination of the first prediction block and the second prediction block; and means for decoding the current block using the multi-hypothesis prediction block.

The details of one or more examples are set forth in the accompanying drawings and the description below. Other features, objects, and advantages will be apparent from the description, drawings, and claims.

BRIEF DESCRIPTION OF DRAWINGS

FIG. 2 is a conceptual diagram illustrating a table representing an example scheme for uni-prediction motion vector selection for geometric partitioning mode (GPM).

DETAILED DESCRIPTION

Figure 1:
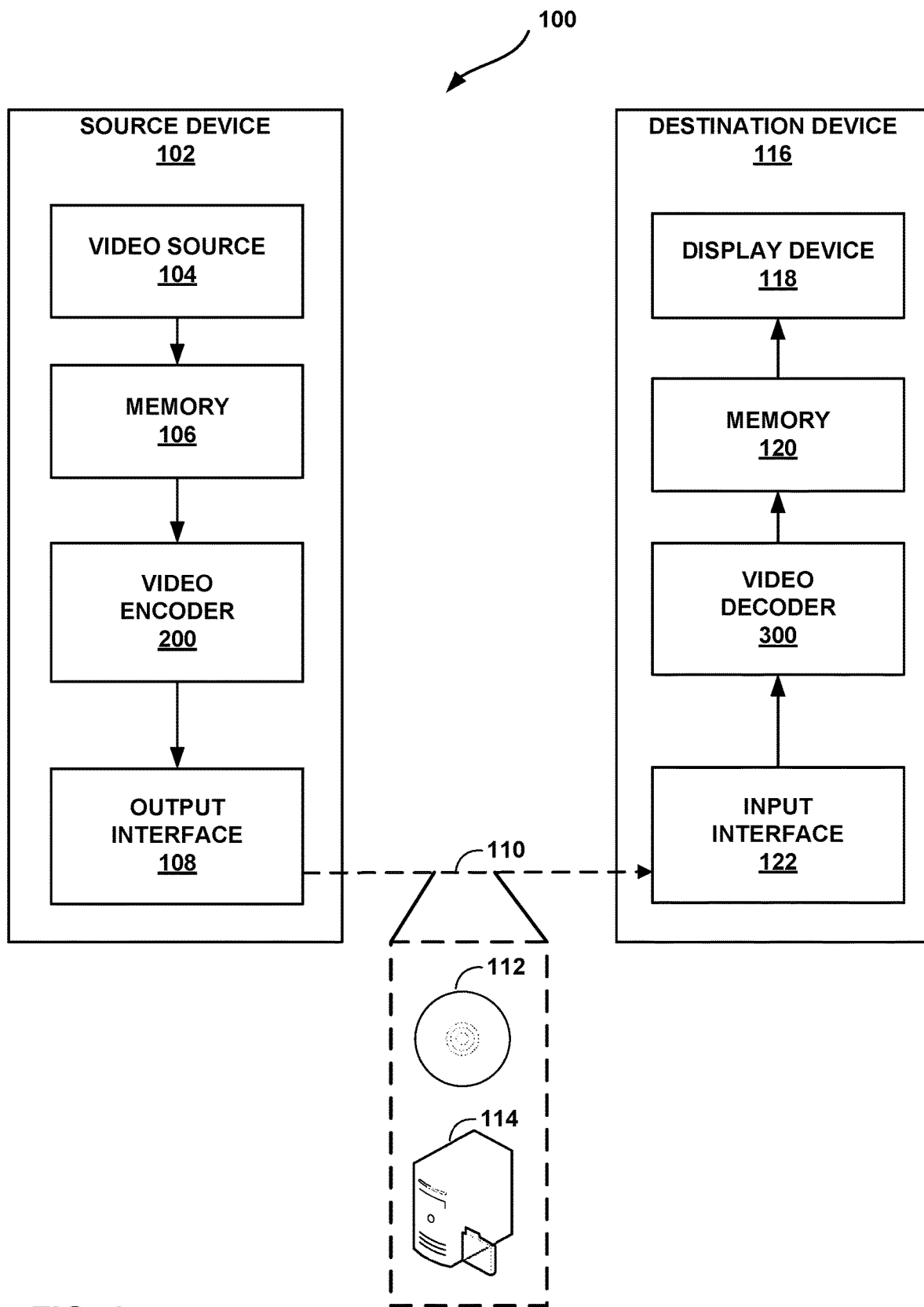
FIG. 1 is a block diagram illustrating an example video encoding and decoding system that may perform the techniques of this disclosure.

Video coding generally includes partitioning pictures of a series of pictures into respective blocks, then coding (encoding or decoding) each of the blocks. Coding a block generally includes predicting the block and coding a residual for the block, that is, a set of differences between the predicted block and the actual block. Prediction can be intra-picture (that is, predicting the current block using data of the picture including the block) or inter-picture (that is, predicting the current block using data of one or more previously coded pictures). Multiple hypothesis inter-prediction refers to using multiple reference blocks in one or more previously coded pictures to predict a current block. For example, a video coder may generate two or more prediction blocks, then combine values of the prediction blocks using averaging, weighted prediction, or the like.

Inter-prediction may be signaled using various coding modes, such as merge mode or advanced motion vector prediction (AMVP) mode. In general, in merge mode, motion information of a signaled neighboring block is used as motion information of a current block, whereas in AMVP mode, motion information of a signaled neighboring block is used to predict a motion vector of the current block, and other motion information (e.g., motion vector difference values and reference picture identifying information) is coded to form the motion information of the current block.

This disclosure describes various example techniques that may be used to apply merge mode signaling to multi-hypothesis inter-prediction. Rather than always signaling one or more of a reference picture index, motion vector predictor index, and/or motion vector difference for multi-hypothesis inter-prediction, the techniques of this disclosure may include coding a merge flag that indicates whether motion information for an additional hypothesis is coded using merge mode or AMVP mode. In particular, signaling the motion information for each motion vector may result in signaling excess data that can overly increase overhead signaling for a video bitstream, and require excess encoding, decoding, and other processing operations. By using merge mode to code motion information for multi-hypothesis inter-prediction, the signaling overhead and the encoding, decoding, and other processing operations can be reduced, without diminishing video quality.

In some examples, a video coder (encoder or decoder) may, when the motion information for the additional hypothesis is coded using merge mode, construct a merge candidate list for the additional hypothesis such that all merge candidates in the merge candidate list are uni-prediction motion information candidates. For example, if a neighboring block to be used as a merge candidate is coded using bi-prediction including first and second motion information, the video coder may construct a merge candidate from the neighboring block using only one of the first motion information or the second motion information. In some examples, the video coder may construct two merge candidates from the neighboring block that is coded using bi-prediction: a first merge candidate using the first motion information and a second merge candidate using the second motion information.

In some examples, the video coder may apply local illumination compensation (LIC) to the additional hypothesis if LIC is applied to the base hypothesis. The video coder may perform LIC in this way in addition to, or in the alternative to, the techniques discussed above.

In some examples, the video coder may determine an interpolation filter to apply when calculating values for half-sample (half-pixel or half-pel) positions for luminance data. For example, if the motion information for the additional hypothesis is coded using merge mode, the interpolation filter may be determined according to the interpolation filter of the merge candidate, instead of the base mode. As another example, if the motion information for the additional hypothesis is coded using AMVP, the interpolation filter may be determined according to the base mode. The video coder may perform interpolation filter inheritance in any of these ways in addition to, or in the alternative to, the techniques discussed above.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coding motion information for multi-hypothesis inter-prediction. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coding motion information for multi-hypothesis inter-prediction. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that code motion information for multi-hypothesis inter-prediction.

In general, video encoder 200 and video decoder 300 may perform block-based coding of pictures. The term "block"

generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

In HEVC, as one example, a bi-directional prediction (also referred to as a bi-prediction) signal is generated by averaging two prediction signals obtained from two different reference pictures and/or using two different motion vectors. In VVC, as another example, the bi-prediction mode is extended beyond simple averaging to allow weighted averaging of the two prediction signals. The following equation represents one example of generation of a prediction block using bi-prediction:

$$P_{bi-pred}=((8-w)*P_0+w*P_1+4)>>3 \qquad (1)$$

In equation (1) above, $P_{bi-pred}$ represents a prediction block formed using bi-prediction, $P_0$ represents a first prediction block formed from a first set of motion information and a first reference picture, $P_1$ represents a second prediction block formed from a second set of motion information and a second reference picture, w represents a weight value, and ">>" represents a bitwise right-shift operator. In VVC, five weight values for w are allowed in the weighted averaging bi-prediction, w∈{−2, 3, 4, 5, 10}. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. In VVC, bi-prediction with CU-level weights (BCW) is only applied to CUs with 256 or more luma samples (i.e., CU width times CU height is greater than or equal to 256). For low-delay pictures, all 5 weights are used. For non-low-delay pictures, only 3 weights (w∈{3,4,5}) are used.

In HEVC, video coders may code motion vector differences (MVDs), representing differences between the motion vector and predicted motion vector of a CU, in units of quarter-luma-sample when use_integer_mv_flag (that is, a syntax element representing whether integer-level or sub-integer level precision is used) is equal to 0 (indicating sub-integer precision) in the slice header. VVC introduced a CU-level adaptive motion vector resolution (AMVR) scheme. AMVR allows the MVD of the CU to be coded in a different precision. Depending on the mode (e.g., normal AMVP mode or affine AVMP mode) for the current CU in VVC, the MVDs of the current CU can be adaptively selected as follows:

Normal AMVP mode: quarter-luma-sample, half-luma-sample, integer-luma-sample or four-luma-sample.

Affine AMVP mode: quarter-luma-sample, integer-luma-sample or 1/16 luma-sample.

The video coder may conditionally code a CU-level MVD resolution if the current CU has at least one non-zero MVD component, per VVC. If all MVD components (that is, both horizontal and vertical MVDs for reference list L0 and reference list L1) are zero, the video coder may infer that quarter-luma-sample MVD resolution is used, without coding additional data to represent the precision (resolution).

For a CU that has at least one non-zero MVD component, per VVC, a first flag is signalled to indicate whether quarter-luma-sample MVD precision is used for the CU. If the first flag is 0, no further signaling is needed and quarter-luma-sample MVD precision is used for the current CU. Otherwise, the video coder codes a second flag that indicates that half-luma-sample or other MVD precisions (integer or four-luma sample) is used for a normal AMVP CU. In the case of half-luma-sample, per VVC, a 6-tap interpolation filter instead of the default 8-tap interpolation filter is used for the half-luma sample position. Otherwise, per VVC, a third flag is signalled to indicate whether integer-luma-sample or four-luma-sample MVD precision is used for normal AMVP CU. In the case of affine AMVP CU, the second flag is used to indicate whether integer-luma-sample or 1/16 luma-sample MVD precision is used. In order to ensure the reconstructed MV has the intended precision (quarter-luma-sample, half-luma-sample, integer-luma-sample or four-luma-sample), the video coder may round motion vector predictors for the CU to the same precision as that of the MVD before adding the predictors together with the MVD. The video coder may round the motion vector predictors toward zero (that is, a negative motion vector predictor is rounded toward positive infinity and a positive motion vector predictor is rounded toward negative infinity).

FIG. 2 is a conceptual diagram illustrating a table representing an example scheme for uni-prediction motion vector selection for geometric partitioning mode (GPM). VVC includes GPM for inter-prediction. In VVC, the geometric partitioning mode is signalled using a CU-level flag as one kind of merge mode, with other merge modes including the regular merge mode, the merge with MVD (MMVD) mode, the cross-component intra prediction (CIIP) mode and the subblock merge mode. In total, 64 partitions are supported by geometric partitioning mode for each possible CU size w×h=$2^m$×$2^n$ with m,n∈{3 . . . 6} excluding 8×64 and 64×8.

When this mode is used, per VVC, a CU is split into two parts by a geometrically located straight line. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived using the process described in the following:

The uni-prediction candidate list is derived directly from the merge candidate list constructed according to the extended merge prediction process in VVC. Denote n as the index of the uni-prediction motion in the geometric uni-prediction candidate list. The LX motion vector of the n-th extended merge candidate, with X equal to the parity of n, is used as the n-th uni-prediction motion vector for geometric partitioning mode. These motion vectors are marked with "x" in FIG. 2. In case a corresponding LX motion vector of the n-the extended merge candidate does not exist, the L(1−X) motion vector of the same candidate is used instead as the uni-prediction motion vector for geometric partitioning mode.

If geometric partitioning mode is used for the current CU, per VVC, the video coder may further code a geometric partition index indicating the partition mode of the geometric partition (angle and offset), and two merge indices (one for each partition). According to VVC, the number of maximum GPM candidate size is coded explicitly in a sequence parameter set (SPS) and specifies syntax binarization for GPM merge indices. After predicting each of part of the geometric partition, the video coder may adjust sample values along the geometric partition edge using a blending processing with adaptive weights.

In nearly all previous and current video coding standards, video coders may employ either uni-direction or bi-direction to temporally predict blocks of video data, which is a single prediction hypothesis. Multiple hypothesis prediction (MHP) was described in Winken et al., "*Multi-hypothesis inter-prediction,*" $10^{th}$ Meeting of JVET of ITU-T SG 16 WP 3 and ISO/IEC JTC 1/SC 29/WG 11, Apr. 10-20, 2018, document no JVET-J0041; Winken et al., "CE10: Multi-Hypothesis Inter Prediction (Tests 1.5-1.8)," $11^{th}$ Meeting of JVET of ITU-T SG 16 WP 3 and ISO/IEC JTC 1/SC 29/WG 11, Jul. 10-18, 2018, document JVET-K0269; Winken et al., "CE10: Multi-Hypothesis Inter Prediction (Tests 1.2.a-1.2.c)," $12^{th}$ Meeting of JVET of ITU-T SG 16 WP 3 and ISO/IEC JTC 1/SC 29/WG 11, Oct. 3-12, 2018, document JVET-L0148 (v3); and Winken et al., "CE10: Multi-hypothesis inter prediction (Test 10.1.2)," $13^{th}$ Meeting of JVET of ITU-T SG 16 WP 3 and ISO/IEC JTC 1/SC 29/WG 11, Jan. 9-18, 2019, document no. JVET-M0425. In MHP per VVC, an inter prediction method allows weighted superposition of more than two motion-compensated prediction signals. The resulting overall prediction signal is obtained by sample-wise weighted superposition. With the uni/bi prediction signal $p_{uni/bi}$ and the first additional inter prediction signal/hypothesis $h_3$, the resulting prediction signal $p_3$ is obtained as follows, per VVC:

$$p_3=(1-\alpha)p_{uni/bi}+\alpha h_3 \quad (2)$$

In equation (2), $p_3$ represents a resulting prediction signal, $p_{uni/bi}$ represents a first prediction block from a first prediction hypothesis, h3 represents a second prediction block from a second prediction hypothesis, and a represents a weight value. In VVC, the weighting factor α is specified by the syntax element add_hyp_weight_idx, according to the following mapping:

| add_hyp_weight_idx | α |
|---|---|
| 0 | ¼ |
| 1 | −⅛ |

Analogously to above, more than one additional prediction signal can be used. Per VVC, the resulting overall prediction signal is accumulated iteratively with each additional prediction signal, as follows:

$$p_{n+1}=(1-\alpha_{n+1})p_n+\alpha_{n+1}h_{n+1} \quad (3)$$

The resulting overall prediction signal is obtained as the last $p_n$ (i.e., the $p_n$ having the largest index n).

For inter prediction blocks using MERGE mode (but not SKIP mode), additional inter prediction signals can also be specified. For the additional prediction signals, one of the two AMVP candidate lists is used, per VVC:

If the picture order count (POC) of the reference picture of the additional prediction signal equals the POC of the used list1 reference picture, the list1 AMVP candidate list is used.

Otherwise the list0 AMVP candidate list is used.

Chang et al., "Compression efficiency methods beyond VVC," $21^{st}$ meeting of JVET of ITU-T SG 16 WP 3 and ISO/IEC JTC 1/SC 29, Jan. 6-15, 2021, document no. JVET-U0100, describes local illumination compensation (LIC). LIC is an inter prediction technique to model local illumination variation between a current block and its prediction block as a function of that between current block template and reference block template. The parameters of the function can be denoted by a scale α and an offset β, which forms a linear equation, that is, α*p[x]+β to compensate illumination changes, where p[x] is a reference sample pointed to by MV at a location x on reference picture. Since α and β can be derived based on current block template and reference block template, no signaling overhead is required for them, except that an LIC flag is signaled for AMVP mode to indicate the use of LIC.

Local illumination compensation for uni-prediction inter CUs was also described in Seregin et al., "CE4-3.1a and CE4-3.1b: Unidirectional local illumination compensation with affine prediction," Jul. 3-12, 2019, document no. JVET-O0066, with the following modifications:

Intra neighbor samples can be used in LIC parameter derivation;

LIC is disabled for blocks with less than 32 luma samples;

For both non-subblock and affine modes, LIC parameter derivation is performed based on the template block samples corresponding to the current CU, instead of partial template block samples corresponding to first top-left 16×16 unit;

Samples of the reference block template are generated by using MC with the block MV without rounding it to integer-pel precision.

Referring again to FIG. 1, according to various techniques of this disclosure, video encoder 200 and video decoder 300 may be configured to perform merge mode for multi-hypothesis inter-prediction. For example, for merge mode for an additional hypothesis, rather than always coding the reference picture index, motion vector predictor index, and motion vector difference (as in the AMVP mode) for the additional hypothesis, video encoder 200 and video decoder 300 may code a merge flag to indicate whether the motion information for the additional hypothesis is coded using MERGE mode or AMVP mode. If the merge flag is true, then video encoder 200 and video decoder 300 may code a merge index to indicate the merge candidate for the additional hypothesis. If the merge flag is false, then video encoder 200 and video decoder 300 may code a reference picture index, motion vector predictor index, and motion vector difference for the additional hypothesis.

In some examples, for one or more additional hypotheses, video encoder 200 and video decoder 300 may construct the merge candidates for merge mode for the additional hypotheses such that each merge candidate represents a uni-prediction motion. In some examples, video encoder 200 and video decoder 300 may use the uni-prediction candidate list as in the geometric partitioning mode, for example as in VVC. Therefore, merge mode for the additional hypotheses may share the same merge candidates list as in geometric partitioning mode.

In other words, to construct the merge candidate list, when a neighboring block is predicted using bi-prediction, video encoder 200 and video decoder 300 may construct either one or two merge candidates from the neighboring block. When the neighboring block is predicted using bi-prediction, the neighboring block will include both first motion information for a first motion vector and second motion information for a second motion vector. Video encoder 200 and video decoder 300 may construct a merge candidate from either or both of the first motion information and/or the second motion information. Thus, video encoder 200 and video decoder 300 may form a uni-prediction merge candidate from the neighboring block including using one of the first motion information or the second motion information. Additionally, video encoder 200 and video decoder 300 may form a second uni-prediction merge candidate from the neighboring block using the second motion information.

In some examples, video encoder 200 and video decoder 300 may code the merge flag for the additional hypothesis as the merge flag for the base mode (where "base mode" refers to the mode on top of which the additional hypothesis is applied, e.g., uni-directional prediction or bi-directional prediction). In some examples, video encoder 200 and video decoder 300 may use the same CABAC context to code this merge flag. In other examples, video encoder 200 and video decoder may code the merge flag for the additional hypothesis using a new CABAC context that is different from the CABAC context that was used for the merge flag signaled in the base mode.

In some examples, video encoder 200 and video decoder 300 may code the merge index for the additional hypothesis using the same CABAC context(s) that is/are used for signaling the merge index for MERGE mode. In other examples, video encoder 200 and video decoder 300 may code the merge index for the additional hypothesis using different CABAC context(s) from the CABAC context(s) that is/are used for coding the merge index in the MERGE mode.

By allowing merge mode to be used to code motion information for an additional hypothesis according to the techniques of this disclosure, motion information coded in the bitstream may be reduced. That is, rather than coding each of a candidate index, a motion vector difference, a reference picture list indicator, and a reference index as motion information for the additional hypothesis, video encoder 200 and video decoder 300 may code a merge index indicating whether merge mode is used to code the motion information for the additional hypothesis, and if so, simply code a candidate index per merge mode. In this manner, a more accurate prediction block can be formed for a current block, and a bitrate associated with coding data used to form the prediction block can be reduced.

In some examples, in the case that merge modes are used for multiple additional hypotheses, video encoder 200 and video decoder 300 may remove the merge candidate(s) that was (were) used in previous additional hypothesis from the merge candidate list for the current additional hypothesis. Therefore, the number of merge candidates in the current additional hypothesis may be reduced. Thus, signaling of the merge index can be correspondingly modified to save bits. For example, if merge candidate i is used in the ordinal $1^{st}$ additional hypothesis and the total number of candidates is N, video encoder 200 and video decoder 300 may remove merge candidate i from the merge candidate list for the ordinal $2^{nd}$ additional hypothesis. The total number of merge candidates for the $2^{nd}$ additional hypothesis would then be N−1. Therefore, the merge index in the $2^{nd}$ additional hypothesis may be coded with truncated binarization code, for example, truncated unary code with the maximum codeword length being N−1 instead of N.

In some examples, video encoder 200 and video decoder 300 may apply local illumination compensation (LIC) to additional hypotheses in merge and/or AMVP mode if LIC is applied to the base mode. In other examples, video encoder 200 and video decoder 300 may infer that LIC is to be applied to the additional hypotheses if the additional hypothesis uses AMVP mode and LIC was applied to the base mode. If the additional hypothesis uses merge mode and LIC was applied to the base mode, video encoder 200 and video decoder 300 may code a LIC flag of a merge candidate representing whether LIC is to be applied to the additional hypothesis.

In VVC, in the case of half-luma-sample MVD resolution, a 6-tap interpolation filter is used instead of the default 8-tap interpolation filter for the half-luma sample position. A merge candidate may inherit such filter switching. According to the techniques of this disclosure, if the motion information for an additional hypothesis is coded using merge mode, whether to apply an alternative switching filter for interpolating a half-luma-sample position or other sample positions may depend on the merge candidate of the additional hypothesis, instead of that of the base mode. Alternatively, if the additional hypothesis is AMVP mode, whether to apply an alternative switching filter for interpolating a half-luma-sample position or other positions may depend on whether interpolation filter switching is performed in the base mode.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block.

Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In this manner, video encoder 200 and video decoder 300 represent examples of devices for decoding (and/or encoding) video data, including: a memory configured to store video data; and one or more processors implemented in circuitry and configured to: generate a first prediction block for a current block of video data using a base inter-prediction mode; code a merge mode syntax element for a second prediction block, the second prediction block representing an additional prediction hypothesis for the current block, wherein the merge mode syntax element indicates whether motion information for the second prediction block is coded using merge mode; code motion information for the second prediction block according to the merge mode syntax element, wherein to code the motion information, the one or more processors are configured to, when the merge mode syntax element indicates that the motion information for the second prediction block is coded using merge mode, form a merge candidate list including one or more merge candidates, each of the merge candidates representing respective sets of uni-prediction motion information; generate the second prediction block for the current block of video data using the motion information; form a multi-hypothesis prediction block for the current block as a combination of the first prediction block and the second prediction block; and decode the current block using the multi-hypothesis prediction block.

Figure 3:
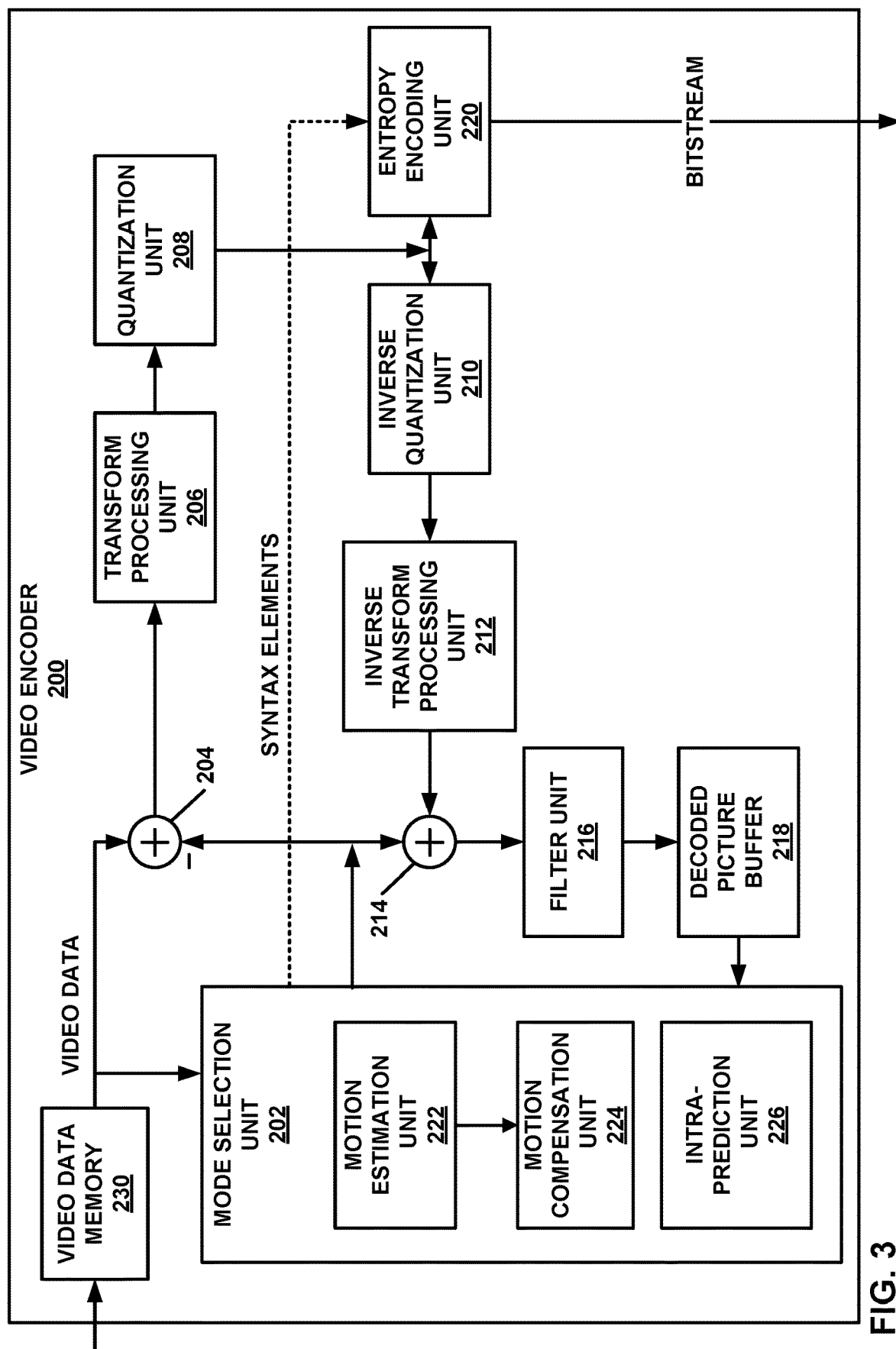
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When performing multi-hypothesis inter-prediction, motion estimation unit 222 and motion compensation unit 224 may generate one or more additional prediction blocks as additional hypotheses for a current block using data of DPB 218. Furthermore, video encoder 200 may be configured to apply any of the various techniques of this disclosure for encoding motion information for the one or more additional prediction hypotheses.

For example, motion compensation unit 224 may generate both a base mode hypothesis and an additional hypothesis. Motion compensation unit 224 may generate the base mode hypothesis using uni-directional or bi-directional inter-prediction. Motion compensation unit 224 may also generate the additional hypothesis using uni- or bi-directional inter-prediction. In some examples, the additional hypothesis may be restricted to uni-directional prediction only. According to the techniques of this disclosure, mode selection unit 202 may determine whether to encode motion information for the additional hypothesis using merge mode or AMVP mode. In response to determining to encode the motion information for the additional hypothesis using merge mode, mode selection unit 202 may assign a value to a merge mode syntax element indicating that the motion information for the additional hypothesis is encoded using merge mode and encode the motion information using merge mode.

In particular, to encode the motion information for the additional hypothesis using merge mode, mode selection unit 202 may construct a merge candidate list. That is, mode selection unit 202 may determine motion information from neighboring blocks to a current block being encoded and add the motion information for certain neighboring blocks to the merge candidate list. Mode selection unit 202 may be configured to restrict merge candidates to be only uni-directional prediction candidates (also referred to as "uni-prediction candidates"). If a neighboring block is predicted using bi-prediction, mode selection unit 202 may generate one or two merge candidates from the neighboring block as discussed above with respect to FIG. 2. For example, mode selection unit 202 may construct a first merge candidate from a first set of motion information for the neighboring block (e.g., L0 motion information) and, in some examples, a second merge candidate from a second set of motion information for the neighboring block (e.g., L1 motion information).

Mode selection unit 202 may also form a merge index having a value indicating which of the merge candidates is to be used to encode the motion information for the additional hypothesis. In particular, mode selection unit 202 may determine whether any of the merge candidates in the merge candidate list has motion information matching that formed by motion estimation unit 222 for the additional hypothesis. Mode selection unit 202 may select the one of the merge candidates in the merge candidate list having the matching motion information as the merge candidate to be used to encode the motion information for the additional hypothesis.

Motion compensation unit 224 may further combine the base hypothesis with the additional hypothesis, e.g., as an average of or a weighted combination of each sample on a sample-by-sample basis. After combining the base hypothesis with the additional hypothesis, motion compensation unit 224 may provide the resulting prediction block to residual generation unit 204 and reconstruction unit 214.

In addition or in the alternative, mode selection unit 202 may determine whether to apply local illumination compensation (LIC) to the additional hypothesis according to whether LIC was applied to the base hypothesis. For example, mode selection unit 202 may determine that LIC is to be applied to the additional hypothesis if LIC was applied to the base hypothesis, and not to apply LIC otherwise. As another example, if LIC was applied to the base hypothesis and motion information for the additional hypothesis was encoded using AMVP, mode selection unit 202 may determine to perform LIC to the additional hypothesis. Alternatively, if LIC was applied to the base hypothesis and motion information for the additional hypothesis was encoded using merge mode, mode selection unit 202 may determine whether to perform LIC on the additional hypothesis, and encode a LIC syntax element (e.g., a LIC flag) indicating whether to perform LIC on the additional hypothesis.

In addition or in the alternative, mode selection unit 202 may determine which of a variety of interpolation filters to use to interpolate a value for a half-sample position. In particular, when a motion vector for a base hypothesis of a previous block has half-sample precision and is encoded using AMVP, and when the previous block is selected as a candidate for encoding motion information of an additional hypothesis, mode selection unit 202 may determine to use a six-tap interpolation filter to interpolate a value for a half-sample position.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 4:
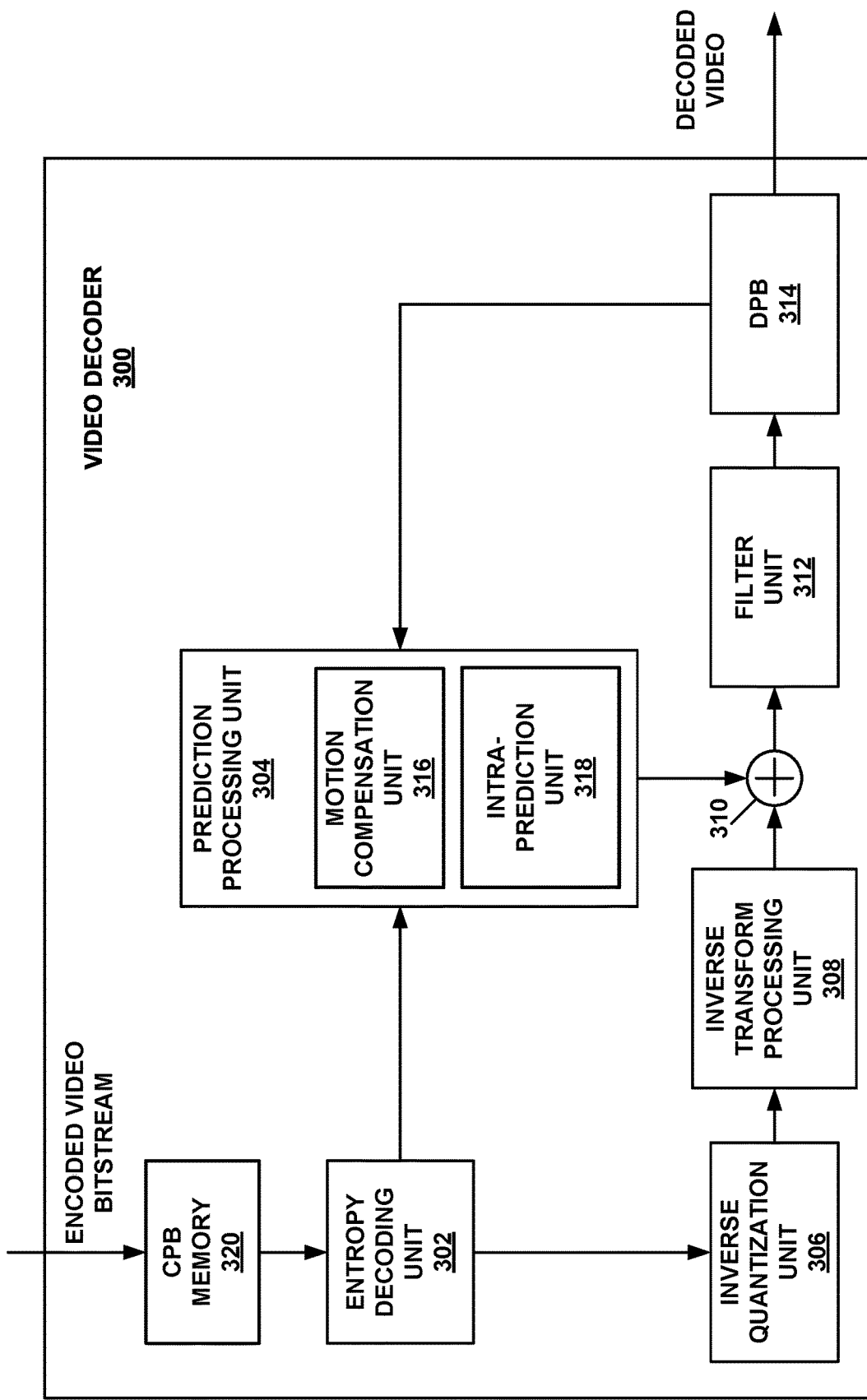
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

When performing multi-hypothesis inter-prediction, motion compensation unit 316 may generate one or more additional prediction blocks as additional hypotheses for a current block using data of DPB 314. Furthermore, video decoder 300 may be configured to apply any of the various techniques of this disclosure for decoding motion information for the one or more additional prediction hypotheses.

For example, motion compensation unit 316 may generate both a base mode hypothesis and an additional hypothesis. Motion compensation unit 316 may generate the base mode hypothesis using uni-directional or bi-directional inter-prediction. Motion compensation unit 316 may also generate the additional hypothesis using uni- or bi-directional inter-prediction. In some examples, the additional hypothesis may be restricted to uni-directional prediction only. According to the techniques of this disclosure, prediction processing unit 304 may determine whether to decode motion information for the additional hypothesis using merge mode or AMVP mode. In particular, prediction processing unit 304 may receive a value for a merge mode syntax element indicating whether the motion information for the additional hypothesis is to be decoded using merge mode or AMVP mode, and decode the motion information using the indicated mode.

To decode the motion information for the additional hypothesis using merge mode, prediction processing unit 304 may construct a merge candidate list. That is, prediction processing unit 304 may determine motion information from neighboring blocks to a current block being decoded and add the motion information for certain neighboring blocks to the merge candidate list. Prediction processing unit 304 may be configured to restrict merge candidates to be only uni-directional prediction candidates (also referred to as "uni-prediction candidates"). If a neighboring block is predicted using bi-prediction, prediction processing unit 304 may generate one or two merge candidates from the neighboring block as discussed above with respect to FIG. 2. For example, prediction processing unit 304 may construct a first merge candidate from a first set of motion information for the neighboring block (e.g., L0 motion information) and, in some examples, a second merge candidate from a second set of motion information for the neighboring block (e.g., L1 motion information).

Prediction processing unit 304 may also receive a merge index having a value indicating which of the merge candidates is to be used to decode the motion information for the additional hypothesis. Prediction processing unit 304 may determine one of the merge candidates in the merge candidate list corresponding to the merge index as the merge candidate to be used to decode the motion information for the additional hypothesis.

Motion compensation unit 316 may further combine the base hypothesis with the additional hypothesis, e.g., as an average of or a weighted combination of each sample on a sample-by-sample basis. After combining the base hypothesis with the additional hypothesis, motion compensation unit 316 may provide the resulting prediction block to reconstruction unit 310.

In addition or in the alternative, prediction processing unit 304 may determine whether to apply local illumination compensation (LIC) to the additional hypothesis according to whether LIC was applied to the base hypothesis. For example, prediction processing unit 304 may determine that LIC is to be applied to the additional hypothesis if LIC was applied to the base hypothesis, and not to apply LIC otherwise. As another example, if LIC was applied to the base hypothesis and motion information for the additional hypothesis was decoded using AMVP, prediction processing unit 304 may determine to perform LIC to the additional hypothesis. Alternatively, if LIC was applied to the base hypothesis and motion information for the additional hypothesis was decoded using merge mode, prediction processing unit 304 may decode a LIC syntax element (e.g., a LIC flag) indicating whether to perform LIC on the additional hypothesis.

In addition or in the alternative, prediction processing unit 304 may determine which of a variety of interpolation filters to use to interpolate a value for a half-sample position. In particular, when a motion vector for a base hypothesis of a previous block has half-sample precision and is decoded using AMVP, and when the previous block is selected as a candidate for decoding motion information of an additional hypothesis, prediction processing unit 304 may determine to use a six-tap interpolation filter to interpolate a value for a half-sample position.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 5:
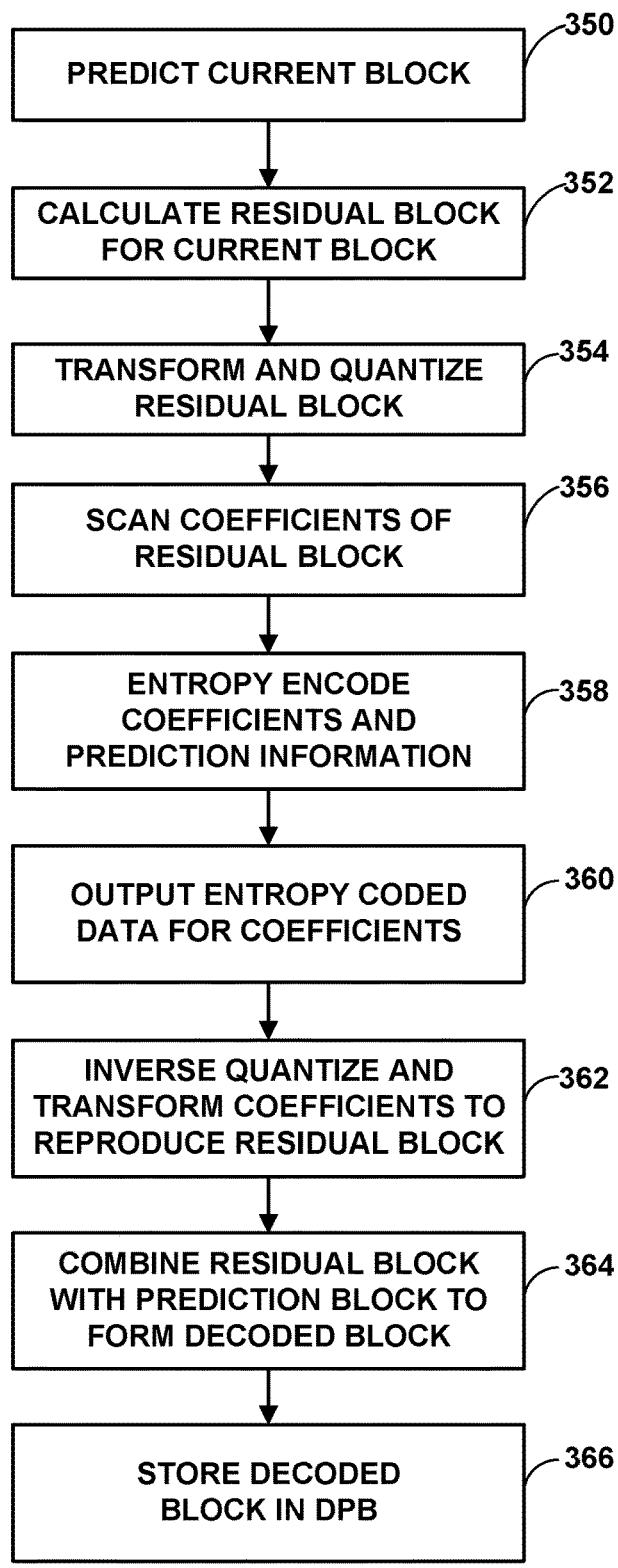
FIG. 5 is a flowchart illustrating an example method for encoding a current block in accordance with the techniques of this disclosure.

FIG. 5 is a flowchart illustrating an example method for encoding a current block in accordance with the techniques of this disclosure. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. In particular, video encoder 200 may form the prediction block using multi-hypothesis inter-prediction. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients, as well as prediction information (358). For example, video encoder 200 may encode data using CAVLC or CABAC. Moreover, video encoder 200 may encode motion information for one or more additional hypotheses using merge mode according to any of the various techniques of this disclosure. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). In some examples, video encoder 200 may perform local illumination compensation (LIC) according to any of the various techniques of this disclosure. Video encoder 200 may then store the decoded block in DPB 218 (366).

Figure 6:
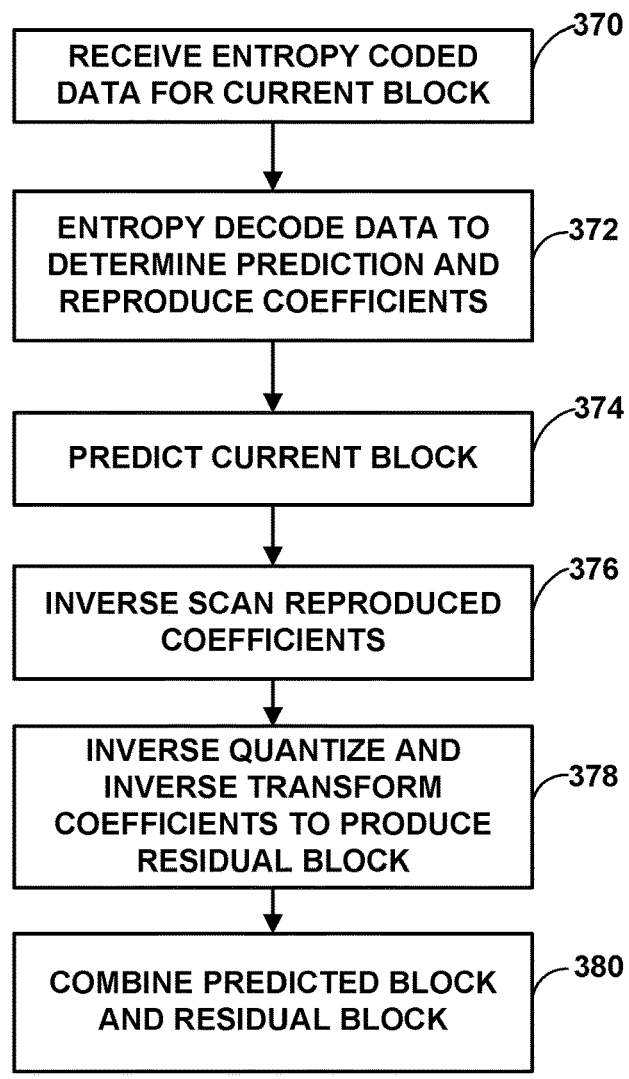
FIG. 6 is a flowchart illustrating an example method for decoding a current block in accordance with the techniques of this disclosure.

FIG. 6 is a flowchart illustrating an example method for decoding a current block of video data in accordance with the techniques of this disclosure. The current block may comprise a current CU. Although described with respect to video decoder 300 (FIGS. 1 and 4), it should be understood that other devices may be configured to perform a method similar to that of FIG. 6.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). For example, video decoder 300 may entropy decode motion information for one or more additional prediction hypotheses in merge mode using any of the various techniques of this disclosure. Video decoder 300 may predict the current block (374), e.g., using multi-hypothesis inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380). In some examples, video decoder 300 may further perform local illumination compensation (LIC) on the decoded block according to any of the various techniques of this disclosure.

Figure 7:
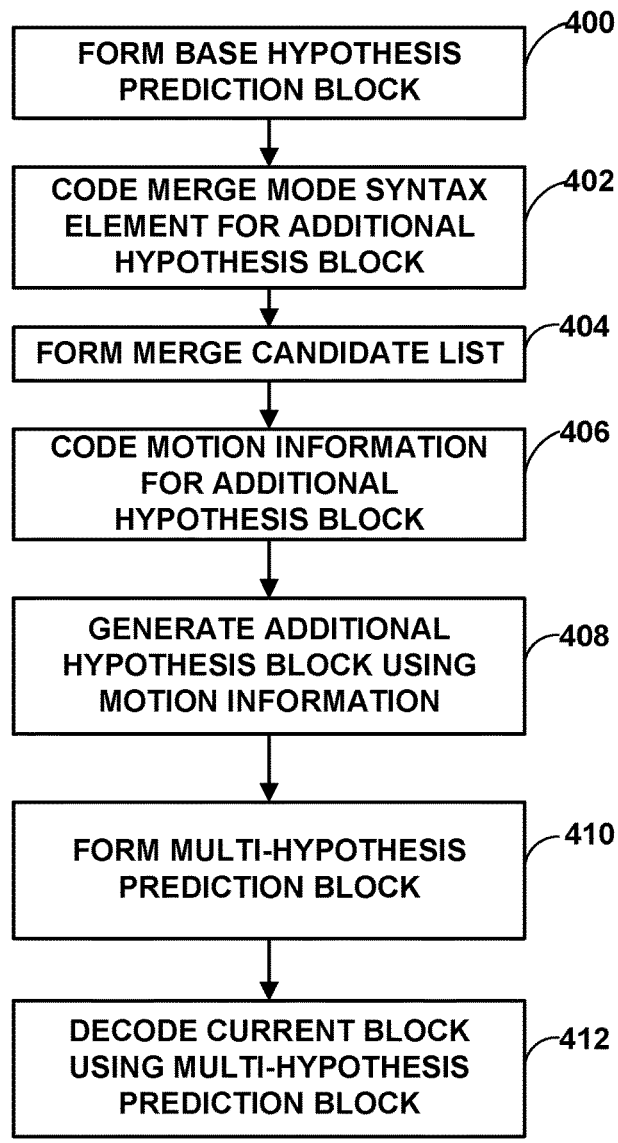
FIG. 7 is a flowchart illustrating an example method of decoding video data according to the techniques of this disclosure.

FIG. 7 is a flowchart illustrating an example method of decoding video data according to the techniques of this disclosure. The method of FIG. 7 may be performed by a video encoder, such as video encoder 200 of FIGS. 1 and 3. When performed as part of a video encoding process, the method of FIG. 7 may correspond to steps 350 and 362-364 of FIG. 5. Alternatively, the method of FIG. 7 may be performed by a video decoder, such as video decoder 300 of FIGS. 1 and 4. When performed as part of a video decoding process, the method of FIG. 7 may correspond to steps 374 and 380 of FIG. 6. While the method of FIG. 7 is described as a method of decoding video data, a video encoder both encodes and decodes video data, for use as subsequent prediction data, as explained above. Therefore, the method of FIG. 7 may be performed by both video encoders and video decoders. For purposes of example, the method of FIG. 7 is explained with respect to video decoder 300, although certain aspects are also explained with respect to video encoder 200.

Initially, video decoder 300 may form a base hypothesis prediction block for a current block of video data (400). For example, video decoder 300 may perform uni-directional prediction (using a single set of motion information) or bi-directional prediction (using two sets of motion information) to form the base hypothesis prediction block.

Video decoder 300 may also code (namely, decode) a merge mode syntax element for an additional hypothesis block for the current block (402). The value of the merge mode syntax element may indicate whether motion information for the additional hypothesis block is coded using merge mode or AMVP mode. When performed by video encoder 200, video encoder 200 may encode the value of the merge mode syntax element.

When the merge mode syntax element indicates that the motion information for the additional hypothesis block is predicted using merge mode, video decoder 300 may form a merge candidate list (404). The merge candidate list may correspond to merge candidates representing motion information of neighboring blocks to the current block. Video decoder 300 may ensure that each of the merge candidates of the merge candidate list includes only uni-directional motion information. If motion information for one of the neighboring blocks is bi-prediction coded, video decoder 300 may form one or two merge candidates from the one of the neighboring blocks, e.g., a single merge candidate including one of the two sets of motion information, or a first merge candidate including one of the two sets of motion information (e.g., L0 motion information) and a second merge candidate including the other of the two sets of motion information (e.g., L1 motion information). In this manner, each merge candidate in the merge candidate list may be restricted to uni-directional prediction.

Video decoder 300 may then code the motion information for the additional hypothesis block (406). For example, assuming the motion information for the additional hypothesis block is coded in merge mode, video decoder 300 may decode a merge index that identifies one of the merge candidates in the merge candidate list. Video decoder 300 may then use the motion information of the identified one of the merge candidates as the motion information to form the additional hypothesis block. On the other hand, if the motion information for the additional hypothesis block is coded in AMVP mode, video decoder 300 may decode an AMVP candidate index, a reference picture list identifier, a reference picture index, and motion vector difference information. Alternatively, when the method is performed by video encoder 200, video encoder 200 may either encode the merge index or the AMVP candidate index, reference picture list identifier, reference picture index, and motion vector difference information.

Video decoder 300 may then generate the additional hypothesis block using the motion information (408). Video decoder 300 may further form the multi-hypothesis prediction block from the base hypothesis prediction block and the additional hypothesis block (410). For example, video decoder 300 may average co-located samples of the base hypothesis prediction block and the additional hypothesis block or perform a weighted combination of the co-located samples of the base hypothesis prediction block and the additional hypothesis block. In some examples, video decoder 300 may also perform local illumination compensation (LIC) on either or both of the base hypothesis block and/or the additional hypothesis block, prior to forming the multi-hypothesis prediction block.

Ultimately, video decoder 300 may decode (i.e., reproduce) the current block using the multi-hypothesis prediction block (412). For example, video decoder 300 may decode quantized transform coefficients for the current block, inverse quantize and transform the quantized transform coefficients to form residual samples, and inverse scan the residual samples to reproduce a residual block. Video decoder 300 may then combine the multi-hypothesis prediction block with the residual block on a sample-by-sample basis to reconstruct (decode) the current block.

In this manner, the method of FIG. 7 represents an example of a method of decoding (and/or encoding) video data including: generating a first prediction block for a current block of video data using a base inter-prediction mode; coding a merge mode syntax element for a second prediction block, the second prediction block representing an additional prediction hypothesis for the current block, wherein the merge mode syntax element indicates whether motion information for the second prediction block is coded using merge mode; coding motion information for the second prediction block according to the merge mode syntax element, including, when the merge mode syntax element indicates that the motion information for the second prediction block is coded using merge mode, forming a merge candidate list including one or more merge candidates, each of the merge candidates representing respective sets of uni-prediction motion information; generating the second prediction block for the current block of video data using the motion information; forming a multi-hypothesis prediction block for the current block as a combination of the first prediction block and the second prediction block; and decoding the current block using the multi-hypothesis prediction block.

Various examples of the techniques of this disclosure are summarized in the following clauses:

Clause 1: A method of decoding video data, the method comprising: generating a first prediction block for a current block of video data using a base inter-prediction mode; generating a second prediction block for the current block of video data as an additional prediction hypothesis; determining whether to apply local illumination compensation (LIC) to the second prediction block according to whether LIC was applied to the first prediction block; forming a multi-hypothesis prediction block for the current block as a combination of the first prediction block and the second prediction block; and decoding the current block using the multi-hypothesis prediction block.

Clause 2: The method of clause 1, wherein the base inter-prediction mode comprises one of uni-directional inter-prediction or bi-directional inter-prediction.

Clause 3: The method of any of clauses 1 and 2, further comprising applying LIC to the first prediction block, wherein determining whether to apply LIC to the second prediction block comprises determining to apply LIC to the second prediction block in response to having applied LIC to the first prediction block.

Clause 4: The method of any of clauses 1 and 2, further comprising: applying LIC to the first prediction block; and coding motion information for the second prediction block using advanced motion vector prediction (AMVP) mode, wherein determining whether to apply LIC to the second prediction block comprises determining to apply LIC to the second prediction block in response to applying LIC to the first prediction block and coding the motion information for the second prediction block using the AMVP mode.

Clause 5: The method of any of clauses 1 and 2, further comprising: applying LIC to the first prediction block; and coding motion information for the second prediction block using merge mode, wherein determining whether to apply LIC to the second prediction block comprises: coding a LIC flag for a merge candidate of the second prediction block; and determining whether to apply LIC to the second prediction block according to the value of the LIC flag for the merge candidate of the second prediction block.

Clause 6: A method of decoding video data, the method comprising: generating a first prediction block for a current block of video data using a base inter-prediction mode; coding a merge mode syntax element for a second prediction block, the second prediction block representing an additional prediction hypothesis for the current block, wherein the merge mode syntax element indicates whether motion information for the second prediction block is coded using merge mode; coding motion information for the second prediction block according to the merge mode syntax element; generating the second prediction block for the current block of video data using the motion information; forming a multi-hypothesis prediction block for the current block as a combination of the first prediction block and the second prediction block; and decoding the current block using the multi-hypothesis prediction block.

Clause 7: A method of coding video data, the method comprising a combination of the method of any of clauses 1-5 and the method of clause 6.

Clause 8: The method of any of clauses 6 and 7, wherein when the merge mode syntax element indicates that merge mode is used, coding the motion information for the second prediction block comprises coding a merge index indicating a merge candidate from which to inherit the motion information for the second prediction block.

Clause 9: The method of any of clauses 6 and 7, wherein when the merge mode syntax element indicates that merge mode is not used, coding the motion information for the second prediction block comprises coding a reference picture index, a motion vector predictor index, and a motion vector difference for the second prediction block.

Clause 10: The method of any of clauses 6-9, wherein coding the motion information for the second prediction block comprises forming a merge candidate list including one or more merge candidates, each of the merge candidates representing respective sets of uni-directional prediction motion information.

Clause 11: The method of clause 10, wherein the second prediction block comprises one additional motion hypothesis of a plurality of additional motion hypotheses, the method further comprising coding motion information for each of the additional motion hypotheses using the same merge candidate list.

Clause 12: The method of any of clauses 10 and 11, wherein forming the merge candidate list comprises forming the merge candidate list according to a merge candidate list construction process of geometric partitioning mode (GPM).

Clause 13: The method of any of clauses 6-9, wherein the second prediction block comprises one additional motion hypothesis of a plurality of additional motion hypotheses, and wherein coding the motion information for the second prediction block comprises: forming a merge candidate list including two or more merge candidates; selecting one of the merge candidates from the merge candidate list for the motion information for the second prediction block; and coding the motion information for the second prediction block using the one of the merge candidates, the method further comprising: removing the one of the merge candidates from the merge candidate list to form a reduced merge candidate list; and coding motion information for a third prediction block using one of the remaining merge candidates in the reduced merge candidate list.

Clause 14: The method of clause 13, further comprising: coding a first merge candidate index for the second prediction block, the merge candidate list having N merge candidates, N being a positive integer greater than 1, the first merge candidate index having a maximum possible truncated binary value of N; and coding a second merge candidate index for the third prediction block, the reduced merge candidate list having N−1 merge candidates, the second merge candidate index having a maximum possible truncated binary value of N−1.

Clause 15: The method of any of clauses 6-14, wherein the merge mode syntax element comprises a merge mode syntax element for the base inter-prediction mode of the first prediction block.

Clause 16: The method of any of clauses 6-14, wherein the merge mode syntax element comprises a second merge mode syntax element, the method further comprising coding a first merge mode syntax element for the base inter-prediction mode of the first prediction block, the second merge mode syntax element being different than the first merge mode syntax element.

Clause 17: The method of clause 16, wherein coding the first merge mode syntax element comprises coding the first merge mode syntax element using a first context adaptive binary arithmetic coding (CABAC) context, and wherein coding the second merge mode syntax element comprises coding the second merge mode syntax element using the first CABAC context in response to having coded the first merge mode syntax element using the first CABAC context.

Clause 18: The method of clause 17, the first CABAC context being a CABAC context used for merge mode.

Clause 19: The method of clause 17, the first CABAC context being different than a second CABAC context used for merge mode.

Clause 20: The method of clause 16, wherein coding the first merge mode syntax element comprises coding the first merge mode syntax element using a first context adaptive binary arithmetic coding (CABAC) context, and wherein coding the second merge mode syntax element comprises coding the second merge mode syntax element using a second CABAC context.

Clause 21: The method of clause 20, the second CABAC context being different than the first CABAC context.

Clause 22: The method of any of clauses 6-21, the method further comprising: coding motion information of a third prediction block using advanced motion vector prediction (AMVP) mode, including coding a motion vector difference (MVD) value having half-luma-sample resolution, the third prediction block being a base inter-prediction block of a neighboring block to the current block; and coding a candidate index identifying the third prediction block as a motion information candidate for the second prediction block, wherein generating the second prediction block comprises interpolating half-pixel samples of a reference block for the second prediction block using a six-tap interpolation filter.

Clause 23: A method of decoding video data, the method comprising: generating a first prediction block for a current block of video data using a base inter-prediction mode; generating a second prediction block for the current block of video data as an additional prediction hypothesis; determining whether to apply local illumination compensation (LIC) to the second prediction block according to whether LIC was applied to the first prediction block; forming a multi-hypothesis prediction block for the current block as a combination of the first prediction block and the second prediction block; and decoding the current block using the multi-hypothesis prediction block.

Clause 24: The method of clause 23, wherein the base inter-prediction mode comprises one of uni-directional inter-prediction or bi-directional inter-prediction.

Clause 25: The method of clause 23, further comprising applying LIC to the first prediction block, wherein determining whether to apply LIC to the second prediction block comprises determining to apply LIC to the second prediction block in response to having applied LIC to the first prediction block.

Clause 26: The method of clause 23, further comprising: applying LIC to the first prediction block; and coding motion information for the second prediction block using advanced motion vector prediction (AMVP) mode, wherein determining whether to apply LIC to the second prediction block comprises determining to apply LIC to the second prediction block in response to applying LIC to the first prediction block and coding the motion information for the second prediction block using AMVP.

Clause 27: The method of clause 23, further comprising: applying LIC to the first prediction block; and coding motion information for the second prediction block using merge mode, wherein determining whether to apply LIC to the second prediction block comprises: coding a LIC flag for a merge candidate of the second prediction block; and determining whether to apply LIC to the second prediction block according to the value of the LIC flag for the merge candidate of the second prediction block.

Clause 28: A method of decoding video data, the method comprising: generating a first prediction block for a current block of video data using a base inter-prediction mode; coding a merge mode syntax element for a second prediction block, the second prediction block representing an additional prediction hypothesis for the current block, wherein the merge mode syntax element indicates whether motion information for the second prediction block is coded using merge mode; coding motion information for the second prediction block according to the merge mode syntax element; generating the second prediction block for the current block of video data using the motion information; forming a multi-hypothesis prediction block for the current block as a combination of the first prediction block and the second prediction block; and decoding the current block using the multi-hypothesis prediction block.

Clause 29: The method of clause 28, wherein when the merge mode syntax element indicates that merge mode is used, coding the motion information for the second prediction block comprises coding a merge index indicating a merge candidate from which to inherit the motion information for the second prediction block.

Clause 30: The method of clause 28, wherein when the merge mode syntax element indicates that merge mode is not used, coding the motion information for the second prediction block comprises coding a reference picture index, a motion vector predictor index, and a motion vector difference for the second prediction block.

Clause 31: The method of clause 28, wherein coding the motion information for the second prediction block comprises forming a merge candidate list including one or more merge candidates, each of the merge candidates representing respective sets of uni-directional prediction motion information.

Clause 32: The method of clause 31, wherein the second prediction block comprises one additional prediction hypothesis of a plurality of additional motion hypotheses, the method further comprising coding motion information for each of the additional motion hypotheses using the same merge candidate list.

Clause 33: The method of clause 31, wherein forming the merge candidate list comprises forming the merge candidate list according to a merge candidate list construction process of geometric partitioning mode (GPM).

Clause 34: The method of clause 28, wherein the second prediction block comprises one additional prediction hypothesis of a plurality of additional motion hypotheses, wherein coding the motion information for the second prediction block comprises: forming a merge candidate list including two or more merge candidates; selecting one of the merge candidates from the merge candidate list for the motion information for the second prediction block; and coding the motion information for the second prediction block using the one of the merge candidates, the method further comprising: removing the one of the merge candidates from the merge candidate list to form a reduced merge candidate list; and coding motion information for a third prediction block using one of the remaining merge candidates in the reduced merge candidate list.

Clause 35: The method of clause 34, further comprising: coding a first merge candidate index for the second prediction block, the merge candidate list having N merge candidates, N being a positive integer greater than 1, the first merge candidate index having a maximum possible truncated binary value of N; and coding a second merge candidate index for the third prediction block, the reduced merge candidate list having N−1 merge candidates, the second merge candidate index having a maximum possible truncated binary value of N−1.

Clause 36: The method of clause 28, wherein the merge mode syntax element comprises a merge mode syntax element for the base inter-prediction mode of the first prediction block.

Clause 37: The method of clause 28, wherein the merge mode syntax element comprises a second merge mode syntax element, the method further comprising coding a first merge mode syntax element for the base inter-prediction mode of the first prediction block, the second merge mode syntax element being different than the first merge mode syntax element.

Clause 38: The method of clause 37, wherein coding the first merge mode syntax element comprises coding the first merge mode syntax element using a first context adaptive binary arithmetic coding (CABAC) context, and wherein coding the second merge mode syntax element comprises coding the second merge mode syntax element using the first CABAC context in response to having coded the first merge mode syntax element using the first CABAC context.

Clause 39: The method of clause 38, the first CABAC context being a CABAC context used for merge mode.

Clause 40: The method of clause 38, the first CABAC context being different than a second CABAC context used for merge mode.

Clause 41: The method of clause 37, wherein coding the first merge mode syntax element comprises coding the first merge mode syntax element using a first context adaptive binary arithmetic coding (CABAC) context, and wherein coding the second merge mode syntax element comprises coding the second merge mode syntax element using a second CABAC context.

Clause 42: The method of clause 41, the second CABAC context being different than the first CABAC context.

Clause 43: The method of clause 28, the method further comprising: coding motion information of a third prediction block using advanced motion vector prediction (AMVP) mode, including coding a motion vector difference (MVD) value having half-luma-sample resolution, the third prediction block being a base inter-prediction block of a neighboring block to the current block; and coding a candidate index identifying the third prediction block as a motion information candidate for the second prediction block, wherein generating the second prediction block comprises interpolating half-pixel samples of a reference block for the second prediction block using a six-tap interpolation filter.

Clause 44: The method of any of clauses 1-43, further comprising encoding the current block prior to decoding the current block.

Clause 45: A device for decoding video data, the device comprising one or more means for performing the method of any of clauses 1-44.

Clause 46: The device of clause 45, wherein the one or more means comprise one or more processors implemented in circuitry.

Clause 47: The device of any of clauses 45 and 46, further comprising a display configured to display the decoded video data.

Clause 48: The device of any of clauses 45-47, wherein the device comprises one or more of a camera, a computer, a mobile device, a broadcast receiver device, or a set-top box.

Clause 49: The device of clause 45-48, further comprising a memory configured to store the video data.

Clause 50: A computer-readable storage medium having stored thereon instructions that, when executed, cause a processor of a device for decoding video data to perform the method of any of clauses 1-44.

Clause 51: A device for decoding video data, the device comprising: means for generating a first prediction block for a current block of video data using a base inter-prediction mode; means for generating a second prediction block for the current block of video data as an additional prediction hypothesis; means for determining whether to apply local illumination compensation (LIC) to the second prediction block according to whether LIC was applied to the first prediction block; means for forming a multi-hypothesis prediction block for the current block as a combination of the first prediction block and the second prediction block; and means for decoding the current block using the multi-hypothesis prediction block.

Clause 52: A device for decoding video data, the device comprising: means for generating a first prediction block for a current block of video data using a base inter-prediction mode; means for coding a merge mode syntax element for a second prediction block, the second prediction block representing an additional prediction hypothesis for the current block, wherein the merge mode syntax element indicates whether motion information for the second prediction block is coded using merge mode; means for coding motion information for the second prediction block according to the merge mode syntax element; means for generating the second prediction block for the current block of video data using the motion information; means for forming a multi-hypothesis prediction block for the current block as a combination of the first prediction block and the second prediction block; and means for decoding the current block using the multi-hypothesis prediction block.

Clause 53: A method of decoding video data, the method comprising: generating a first prediction block for a current block of video data using a base inter-prediction mode; coding a merge mode syntax element for a second prediction block, the second prediction block representing an additional prediction hypothesis for the current block, wherein the merge mode syntax element indicates whether motion information for the second prediction block is coded using merge mode; coding motion information for the second prediction block according to the merge mode syntax element, including, when the merge mode syntax element indicates that the motion information for the second prediction block is coded using merge mode, forming a merge candidate list including one or more merge candidates, each of the merge candidates representing respective sets of uni-prediction motion information; generating the second prediction block for the current block of video data using the motion information; forming a multi-hypothesis prediction block for the current block as a combination of the first prediction block and the second prediction block; and decoding the current block using the multi-hypothesis prediction block.

Clause 54: The method of clause 53, wherein when the merge mode syntax element indicates that merge mode is used, coding the motion information for the second prediction block comprises coding a merge index indicating a merge candidate from which to inherit the motion information for the second prediction block.

Clause 55: The method of clause 53, wherein when the merge mode syntax element indicates that merge mode is not used, coding the motion information for the second prediction block comprises coding a reference picture index, a motion vector predictor index, and a motion vector difference for the second prediction block.

Clause 56: The method of clause 53, wherein forming the merge candidate list comprises: determining that a neighboring block to the second prediction block is bi-predicted using first motion information and second motion information; and forming at least one uni-prediction merge candidate from the neighboring block, including selecting only one of the first motion information or the second motion information for the at least one uni-prediction merge candidate.

Clause 57: The method of clause 56, wherein forming the merge candidate list comprises: forming a first uni-prediction merge candidate using the first motion information; and forming a second uni-prediction merge candidate using the second motion information.

Clause 58: The method of clause 53, wherein the second prediction block comprises one additional prediction hypothesis of a plurality of additional motion hypotheses, the method further comprising coding motion information for each of the additional motion hypotheses using the same merge candidate list.

Clause 59: The method of clause 53, wherein forming the merge candidate list comprises forming the merge candidate list according to a merge candidate list construction process of geometric partitioning mode (GPM).

Clause 60: The method of clause 53, wherein the second prediction block comprises one additional prediction hypothesis of a plurality of additional motion hypotheses, wherein coding the motion information for the second prediction block comprises: forming a merge candidate list including two or more merge candidates; selecting one of the merge candidates from the merge candidate list for the motion information for the second prediction block; and coding the motion information for the second prediction block using the one of the merge candidates, the method further comprising: removing the one of the merge candidates from the merge candidate list to form a reduced merge candidate list; and coding motion information for a third prediction candidate using one of the remaining merge candidates in the reduced merge candidate list.

Clause 61: The method of clause 60, further comprising: coding a first merge candidate index for the second prediction block, the merge candidate list having N merge candidates, N being a positive integer greater than 1, the first merge candidate index having a maximum possible truncated binary value of N; and coding a second merge candidate index for the third prediction block, the reduced merge candidate list having N−1 merge candidates, the second merge candidate index having a maximum possible truncated binary value of N−1.

Clause 62: The method of clause 53, wherein the merge mode syntax element comprises a merge mode syntax element for the base inter-prediction mode of the first prediction block.

Clause 63: The method of clause 53, wherein the merge mode syntax element comprises a second merge mode syntax element, the method further comprising coding a first merge mode syntax element for the base inter-prediction mode of the first prediction block, the second merge mode syntax element being different than the first merge mode syntax element.

Clause 64: The method of clause 63, wherein coding the first merge mode syntax element comprises coding the first merge mode syntax element using a first context adaptive binary arithmetic coding (CABAC) context, and wherein coding the second merge mode syntax element comprises coding the second merge mode syntax element using the first CABAC context in response to having coded the first merge mode syntax element using the first CABAC context.

Clause 65: The method of clause 64, the first CABAC context being a CABAC context used for merge mode.

Clause 66: The method of clause 64, the first CABAC context being different than a second CABAC context used for merge mode.

Clause 67: The method of clause 63, wherein coding the first merge mode syntax element comprises coding the first merge mode syntax element using a first context adaptive binary arithmetic coding (CABAC) context, and wherein coding the second merge mode syntax element comprises coding the second merge mode syntax element using a second CABAC context.

Clause 68: The method of clause 67, the second CABAC context being different than the first CABAC context.

Clause 69: The method of clause 53, further comprising: coding motion information of a third prediction block using advanced motion vector prediction (AMVP) mode, including coding a motion vector difference (MVD) value having half-luma-sample resolution, the third prediction block being a base inter-prediction block of a neighboring block to the current block; and coding a candidate index identifying the third prediction block as a motion information candidate for the second prediction block, wherein generating the second prediction block comprises interpolating half-pixel samples of a reference block for the second prediction block using a six-tap interpolation filter.

Clause 70: The method of clause 53, further comprising determining whether to apply local illumination compensation (LIC) to the second prediction block according to whether LIC was applied to the first prediction block.

Clause 71: The method of clause 70, wherein the base inter-prediction mode comprises one of uni-directional inter-prediction or bi-directional inter-prediction.

Clause 72: The method of clause 70, further comprising applying LIC to the first prediction block, wherein determining whether to apply LIC to the second prediction block comprises determining to apply LIC to the second prediction block in response to having applied LIC to the first prediction block.

Clause 73: The method of clause 70, further comprising: applying LIC to the first prediction block; and coding motion information for the second prediction block using advanced motion vector prediction (AMVP) mode, wherein determining whether to apply LIC to the second prediction block comprises determining to apply LIC to the second prediction block in response to applying LIC to the first prediction block and coding the motion information for the second prediction block using AMVP.

Clause 74: The method of clause 70, further comprising: applying LIC to the first prediction block; and coding motion information for the second prediction block using merge mode, wherein determining whether to apply LIC to the second prediction block comprises: coding a LIC flag for a merge candidate of the second prediction block; and determining whether to apply LIC to the second prediction block according to the value of the LIC flag for the merge candidate of the second prediction block.

Clause 75: The method of clause 53, further comprising encoding the current block prior to decoding the current block.

Clause 76: A device for decoding video data, the device comprising: a memory configured to store video data; and one or more processors implemented in circuitry and configured to: generate a first prediction block for a current block of video data using a base inter-prediction mode; code a merge mode syntax element for a second prediction block, the second prediction block representing an additional prediction hypothesis for the current block, wherein the merge mode syntax element indicates whether motion information for the second prediction block is coded using merge mode; code motion information for the second prediction block according to the merge mode syntax element, wherein to code the motion information, the one or more processors are configured to, when the merge mode syntax element indicates that the motion information for the second prediction block is coded using merge mode, form a merge candidate list including one or more merge candidates, each of the merge candidates representing respective sets of uni-prediction motion information; generate the second prediction block for the current block of video data using the motion information; form a multi-hypothesis prediction block for the current block as a combination of the first prediction block and the second prediction block; and decode the current block using the multi-hypothesis prediction block.

Clause 77: The device of clause 76, wherein to form the merge candidate list, the one or more processors are configured to: determine that a neighboring block to the second prediction block is bi-predicted using first motion information and second motion information; and form at least one uni-prediction merge candidate from the neighboring block, wherein the one or more processors are configured to select only one of the first motion information or the second motion information for the at least one uni-prediction merge candidate.

Clause 78: The device of clause 77, wherein to form the merge candidate list, the one or more processors are configured to: form a first uni-prediction merge candidate using the first motion information; and form a second uni-prediction merge candidate using the second motion information.

Clause 79: The device of clause 76, wherein the one or more processors are further configured to: code motion information of a third prediction block using advanced motion vector prediction (AMVP) mode, wherein to code the motion information of the third prediction block, the one or more processors are configured to code a motion vector difference (MVD) value having half-luma-sample resolution, the third prediction block being a base inter-prediction block of a neighboring block to the current block; and code a candidate index identifying the third prediction block as a motion information candidate for the second prediction block, wherein to generate the second prediction block, the one or more processors are configured to interpolate half-pixel samples of a reference block for the second prediction block using a six-tap interpolation filter.

Clause 80: The device of clause 76, wherein the one or more processors are further configured to determine whether to apply local illumination compensation (LIC) to the second prediction block according to whether LIC was applied to the first prediction block.

Clause 81: The device of clause 76, wherein the one or more processors are further configured to encode the current block prior to decoding the current block.

Clause 82: The device of clause 76, further comprising a display configured to display the decoded video data.

Clause 83: The device of clause 76, wherein the device comprises one or more of a camera, a computer, a mobile device, a broadcast receiver device, or a set-top box.

Clause 84: A computer-readable storage medium having stored thereon instructions that, when executed, cause a processor to: generate a first prediction block for a current block of video data using a base inter-prediction mode; code a merge mode syntax element for a second prediction block, the second prediction block representing an additional prediction hypothesis for the current block, wherein the merge mode syntax element indicates whether motion information for the second prediction block is coded using merge mode; code motion information for the second prediction block according to the merge mode syntax element, including, when the merge mode syntax element indicates that the motion information for the second prediction block is coded using merge mode, forming a merge candidate list including one or more merge candidates, each of the merge candidates representing respective sets of uni-prediction motion information; generate the second prediction block for the current block of video data using the motion information; form a multi-hypothesis prediction block for the current block as a combination of the first prediction block and the second prediction block; and decode the current block using the multi-hypothesis prediction block.

Clause 85: The computer-readable storage medium of clause 84, wherein the instructions that cause the processor to form the merge candidate list comprise instructions that cause the processor to: determine that a neighboring block to the second prediction block is bi-predicted using first motion information and second motion information; and form at least one uni-prediction merge candidate from the neighboring block, including instructions that cause the processor to select only one of the first motion information or the second motion information for the at least one uni-prediction merge candidate.

Clause 86: The computer-readable storage medium of clause 85, wherein the instructions that cause the processor to form the merge candidate list comprise instructions that cause the processor to: form a first uni-prediction merge candidate using the first motion information; and form a second uni-prediction merge candidate using the second motion information.

Clause 87: The computer-readable storage medium of clause 84, further comprising instructions that cause the processor to: code motion information of a third prediction block using advanced motion vector prediction (AMVP) mode, wherein the instructions that cause the processor to code the motion information of the third prediction block comprise instructions that cause the processor to code a motion vector difference (MVD) value having half-luma-sample resolution, the third prediction block being a base inter-prediction block of a neighboring block to the current block; and code a candidate index identifying the third prediction block as a motion information candidate for the second prediction block, wherein the instructions that cause the processor to generate the second prediction block comprise instructions that cause the processor to interpolate half-pixel samples of a reference block for the second prediction block using a six-tap interpolation filter.

Clause 88: The computer-readable storage medium of clause 84, further comprising instructions that cause the processor to determine whether to apply local illumination compensation (LIC) to the second prediction block according to whether LIC was applied to the first prediction block.

Clause 89: The computer-readable storage medium of clause 84, further comprising instructions that cause the processor to encode the current block prior to decoding the current block.

Clause 90: A device for decoding video data, the device comprising: means for generating a first prediction block for a current block of video data using a base inter-prediction mode; means for coding a merge mode syntax element for a second prediction block, the second prediction block representing an additional prediction hypothesis for the current block, wherein the merge mode syntax element indicates whether motion information for the second prediction block is coded using merge mode; means for coding motion information for the second prediction block according to the merge mode syntax element, including means for forming, when the merge mode syntax element indicates that the motion information for the second prediction block is coded using merge mode, a merge candidate list including one or more merge candidates, each of the merge candidates representing respective sets of uni-prediction motion information; means for generating the second prediction block for the current block of video data using the motion information; means for forming a multi-hypothesis prediction block for the current block as a combination of the first prediction block and the second prediction block; and means for decoding the current block using the multi-hypothesis prediction block.

Clause 91: A method of decoding video data, the method comprising: generating a first prediction block for a current block of video data using a base inter-prediction mode; coding a merge mode syntax element for a second prediction block, the second prediction block representing an additional prediction hypothesis for the current block, wherein the merge mode syntax element indicates whether motion information for the second prediction block is coded using merge mode; coding motion information for the second prediction block according to the merge mode syntax element, including, when the merge mode syntax element indicates that the motion information for the second prediction block is coded using merge mode, forming a merge candidate list including one or more merge candidates, each of the merge candidates representing respective sets of uni-prediction motion information; generating the second prediction block for the current block of video data using the motion information; forming a multi-hypothesis prediction block for the current block as a combination of the first prediction block and the second prediction block; and decoding the current block using the multi-hypothesis prediction block.

Clause 92: The method of clause 91, wherein when the merge mode syntax element indicates that merge mode is used, coding the motion information for the second prediction block comprises coding a merge index indicating a merge candidate from which to inherit the motion information for the second prediction block.

Clause 93: The method of any of clauses 91 and 92, wherein when the merge mode syntax element indicates that merge mode is not used, coding the motion information for the second prediction block comprises coding a reference picture index, a motion vector predictor index, and a motion vector difference for the second prediction block.

Clause 94: The method of any of clauses 91-93, wherein forming the merge candidate list comprises: determining that a neighboring block to the second prediction block is bi-predicted using first motion information and second motion information; and forming at least one uni-prediction merge candidate from the neighboring block, including selecting only one of the first motion information or the second motion information for the at least one uni-prediction merge candidate.

Clause 95: The method of clause 94, wherein forming the merge candidate list comprises: forming a first uni-prediction merge candidate using the first motion information; and forming a second uni-prediction merge candidate using the second motion information.

Clause 96: The method of any of clauses 91-95, wherein the second prediction block comprises one additional prediction hypothesis of a plurality of additional motion hypotheses, the method further comprising coding motion information for each of the additional motion hypotheses using the same merge candidate list.

Clause 97: The method of any of clauses 91-96, wherein forming the merge candidate list comprises forming the merge candidate list according to a merge candidate list construction process of geometric partitioning mode (GPM).

Clause 98: The method of any of clauses 91-97, wherein the second prediction block comprises one additional prediction hypothesis of a plurality of additional motion hypotheses, wherein coding the motion information for the second prediction block comprises: forming a merge candidate list including two or more merge candidates; selecting one of the merge candidates from the merge candidate list for the motion information for the second prediction block; and coding the motion information for the second prediction block using the one of the merge candidates, the method further comprising: removing the one of the merge candidates from the merge candidate list to form a reduced merge candidate list; and coding motion information for a third prediction candidate using one of the remaining merge candidates in the reduced merge candidate list.

Clause 99: The method of clause 98, further comprising: coding a first merge candidate index for the second prediction block, the merge candidate list having N merge candidates, N being a positive integer greater than 1, the first merge candidate index having a maximum possible truncated binary value of N; and coding a second merge candidate index for the third prediction block, the reduced merge candidate list having N−1 merge candidates, the second merge candidate index having a maximum possible truncated binary value of N−1.

Clause 100: The method of any of clauses 91-99, wherein the merge mode syntax element comprises a merge mode syntax element for the base inter-prediction mode of the first prediction block.

Clause 101: The method of any of clauses 91-100, wherein the merge mode syntax element comprises a second merge mode syntax element, the method further comprising coding a first merge mode syntax element for the base inter-prediction mode of the first prediction block, the second merge mode syntax element being different than the first merge mode syntax element.

Clause 102: The method of clause 101, wherein coding the first merge mode syntax element comprises coding the first merge mode syntax element using a first context adaptive binary arithmetic coding (CABAC) context, and wherein coding the second merge mode syntax element comprises coding the second merge mode syntax element using the first CABAC context in response to having coded the first merge mode syntax element using the first CABAC context.

Clause 103: The method of clause 102, the first CABAC context being a CABAC context used for merge mode.

Clause 104: The method of clause 102, the first CABAC context being different than a second CABAC context used for merge mode.

Clause 105: The method of clause 101, wherein coding the first merge mode syntax element comprises coding the first merge mode syntax element using a first context adaptive binary arithmetic coding (CABAC) context, and wherein coding the second merge mode syntax element comprises coding the second merge mode syntax element using a second CABAC context.

Clause 106: The method of clause 105, the second CABAC context being different than the first CABAC context.

Clause 107: The method of any of clauses 91-106, further comprising: coding motion information of a third prediction block using advanced motion vector prediction (AMVP) mode, including coding a motion vector difference (MVD) value having half-luma-sample resolution, the third prediction block being a base inter-prediction block of a neighboring block to the current block; and coding a candidate index identifying the third prediction block as a motion information candidate for the second prediction block, wherein generating the second prediction block comprises interpolating half-pixel samples of a reference block for the second prediction block using a six-tap interpolation filter.

Clause 108: The method of any of clauses 91-107, further comprising determining whether to apply local illumination compensation (LIC) to the second prediction block according to whether LIC was applied to the first prediction block.

Clause 109: The method of clause 108, wherein the base inter-prediction mode comprises one of uni-directional inter-prediction or bi-directional inter-prediction.

Clause 110: The method of any of clauses 108 and 109, further comprising applying LIC to the first prediction block, wherein determining whether to apply LIC to the second prediction block comprises determining to apply LIC to the second prediction block in response to having applied LIC to the first prediction block.

Clause 111: The method of any of clauses 108-110, further comprising: applying LIC to the first prediction block; and coding motion information for the second prediction block using advanced motion vector prediction (AMVP) mode, wherein determining whether to apply LIC to the second prediction block comprises determining to apply LIC to the second prediction block in response to applying LIC to the first prediction block and coding the motion information for the second prediction block using AMVP.

Clause 112: The method of any of clauses 108-111, further comprising: applying LIC to the first prediction block; and coding motion information for the second prediction block using merge mode, wherein determining whether to apply LIC to the second prediction block comprises: coding a LIC flag for a merge candidate of the second prediction block; and determining whether to apply LIC to the second prediction block according to the value of the LIC flag for the merge candidate of the second prediction block.

Clause 113: The method of any of clauses 91-112, further comprising encoding the current block prior to decoding the current block.

Clause 114: A device for decoding video data, the device comprising: a memory configured to store video data; and one or more processors implemented in circuitry and configured to: generate a first prediction block for a current block of video data using a base inter-prediction mode; code a merge mode syntax element for a second prediction block, the second prediction block representing an additional prediction hypothesis for the current block, wherein the merge mode syntax element indicates whether motion information for the second prediction block is coded using merge mode; code motion information for the second prediction block according to the merge mode syntax element, wherein to code the motion information, the one or more processors are configured to, when the merge mode syntax element indicates that the motion information for the second prediction block is coded using merge mode, form a merge candidate list including one or more merge candidates, each of the merge candidates representing respective sets of uni-prediction motion information; generate the second prediction block for the current block of video data using the motion information; form a multi-hypothesis prediction block for the current block as a combination of the first prediction block and the second prediction block; and decode the current block using the multi-hypothesis prediction block.

Clause 115: The device of clause 114, wherein to form the merge candidate list, the one or more processors are configured to: determine that a neighboring block to the second prediction block is bi-predicted using first motion information and second motion information; and form at least one uni-prediction merge candidate from the neighboring block, wherein the one or more processors are configured to select only one of the first motion information or the second motion information for the at least one uni-prediction merge candidate.

Clause 116: The device of clause 115, wherein to form the merge candidate list, the one or more processors are configured to: form a first uni-prediction merge candidate using the first motion information; and form a second uni-prediction merge candidate using the second motion information.

Clause 117: The device of any of clauses 114-116, wherein the one or more processors are further configured to: code motion information of a third prediction block using advanced motion vector prediction (AMVP) mode, wherein to code the motion information of the third prediction block, the one or more processors are configured to code a motion vector difference (MVD) value having half-luma-sample resolution, the third prediction block being a base inter-prediction block of a neighboring block to the current block; and code a candidate index identifying the third prediction block as a motion information candidate for the second prediction block, wherein to generate the second prediction block, the one or more processors are configured to interpolate half-pixel samples of a reference block for the second prediction block using a six-tap interpolation filter.

Clause 118: The device of any of clauses 114-117, wherein the one or more processors are further configured to determine whether to apply local illumination compensation (LIC) to the second prediction block according to whether LIC was applied to the first prediction block.

Clause 119: The device of any of clauses 114-118, wherein the one or more processors are further configured to encode the current block prior to decoding the current block.

Clause 120: The device of any of clauses 114-119, further comprising a display configured to display the decoded video data.

Clause 121: The device of any of clauses 114-120, wherein the device comprises one or more of a camera, a computer, a mobile device, a broadcast receiver device, or a set-top box.

Clause 122: A computer-readable storage medium having stored thereon instructions that, when executed, cause a processor to: generate a first prediction block for a current block of video data using a base inter-prediction mode; code a merge mode syntax element for a second prediction block, the second prediction block representing an additional prediction hypothesis for the current block, wherein the merge mode syntax element indicates whether motion information for the second prediction block is coded using merge mode; code motion information for the second prediction block according to the merge mode syntax element, including, when the merge mode syntax element indicates that the motion information for the second prediction block is coded using merge mode, forming a merge candidate list including one or more merge candidates, each of the merge candidates representing respective sets of uni-prediction motion information; generate the second prediction block for the current block of video data using the motion information; form a multi-hypothesis prediction block for the current block as a combination of the first prediction block and the second prediction block; and decode the current block using the multi-hypothesis prediction block.

Clause 123: The computer-readable storage medium of clause 122, wherein the instructions that cause the processor to form the merge candidate list comprise instructions that cause the processor to: determine that a neighboring block to the second prediction block is bi-predicted using first motion information and second motion information; and form at least one uni-prediction merge candidate from the neighboring block, including instructions that cause the processor to select only one of the first motion information or the second motion information for the at least one uni-prediction merge candidate.

Clause 124: The computer-readable storage medium of clause 123, wherein the instructions that cause the processor to form the merge candidate list comprise instructions that cause the processor to: form a first uni-prediction merge candidate using the first motion information; and form a second uni-prediction merge candidate using the second motion information.

Clause 125: The computer-readable storage medium of any of clauses 122-124, further comprising instructions that cause the processor to: code motion information of a third prediction block using advanced motion vector prediction (AMVP) mode, wherein the instructions that cause the processor to code the motion information of the third prediction block comprise instructions that cause the processor to code a motion vector difference (MVD) value having half-luma-sample resolution, the third prediction block being a base inter-prediction block of a neighboring block to the current block; and code a candidate index identifying the third prediction block as a motion information candidate for the second prediction block, wherein the instructions that cause the processor to generate the second prediction block comprise instructions that cause the processor to interpolate half-pixel samples of a reference block for the second prediction block using a six-tap interpolation filter.

Clause 126: The computer-readable storage medium of any of clauses 122-125, further comprising instructions that cause the processor to determine whether to apply local illumination compensation (LIC) to the second prediction block according to whether LIC was applied to the first prediction block.

Clause 127: The computer-readable storage medium of any of clauses 122-126, further comprising instructions that cause the processor to encode the current block prior to decoding the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    generating a first prediction block for a current block of video data using a base inter-prediction mode, the first prediction block including first prediction samples for each sample of the current block;
    coding a merge mode syntax element for a second prediction block, the second prediction block representing an additional prediction hypothesis for the current block, wherein the merge mode syntax element indicates whether motion information for the second prediction block is coded using merge mode;
    coding motion information for the second prediction block according to the merge mode syntax element, including, when the merge mode syntax element indicates that the motion information for the second prediction block is coded using merge mode, forming a merge candidate list including one or more merge candidates, each of the merge candidates representing respective sets of uni-prediction motion information;
    generating the second prediction block for the current block of video data using the motion information, the second prediction block including second prediction samples for each sample of the current block;
    forming a multi-hypothesis prediction block for the current block as a combination of each of the first prediction samples of the first prediction block and each of the second prediction samples of the second prediction block; and
    decoding the current block using the multi-hypothesis prediction block.

2. The method of claim 1, wherein when the merge mode syntax element indicates that merge mode is used, coding the motion information for the second prediction block comprises coding a merge index indicating a merge candidate from which to inherit the motion information for the second prediction block.

3. The method of claim 1, wherein when the merge mode syntax element indicates that merge mode is not used, coding the motion information for the second prediction block comprises coding a reference picture list identifier, a reference picture index, a motion vector predictor index, and a motion vector difference for the second prediction block.

4. The method of claim 1, wherein forming the merge candidate list comprises:
    determining that a neighboring block to the second prediction block is bi-predicted using first motion information and second motion information; and
    forming at least one uni-prediction merge candidate from the neighboring block, including selecting only one of the first motion information or the second motion information for the at least one uni-prediction merge candidate.

5. The method of claim 4, wherein forming the merge candidate list comprises:
    forming a first uni-prediction merge candidate using the first motion information; and
    forming a second uni-prediction merge candidate using the second motion information.

6. The method of claim 1, wherein the second prediction block comprises one additional prediction hypothesis of a plurality of additional prediction hypotheses, the method further comprising coding motion information for each of the additional prediction hypotheses using the same merge candidate list.

7. The method of claim 1, wherein forming the merge candidate list comprises forming the merge candidate list according to a merge candidate list construction process of geometric partitioning mode (GPM).

8. The method of claim 1, wherein the second prediction block comprises one additional prediction hypothesis of a plurality of additional prediction hypotheses, wherein coding the motion information for the second prediction block comprises:
    forming a merge candidate list including two or more merge candidates;
    selecting one of the merge candidates from the merge candidate list for the motion information for the second prediction block; and
    coding the motion information for the second prediction block using the one of the merge candidates,
    the method further comprising:
    removing the one of the merge candidates from the merge candidate list to form a reduced merge candidate list; and
    coding motion information for a third prediction candidate using one of the remaining merge candidates in the reduced merge candidate list.

9. The method of claim 8, further comprising:
    coding a first merge candidate index for the second prediction block, the merge candidate list having N merge candidates, N being a positive integer greater than 1, the first merge candidate index having a maximum possible truncated binary value of N; and
coding a second merge candidate index for the third prediction candidate, the reduced merge candidate list having N−1 merge candidates, the second merge candidate index having a maximum possible truncated binary value of N−1.

10. The method of claim 1, wherein the merge mode syntax element comprises a merge mode syntax element for the base inter-prediction mode of the first prediction block.

11. The method of claim 1, wherein the merge mode syntax element comprises a second merge mode syntax element, the method further comprising coding a first merge mode syntax element for the base inter-prediction mode of the first prediction block, the second merge mode syntax element being different than the first merge mode syntax element.

12. The method of claim 11, wherein coding the first merge mode syntax element comprises coding the first merge mode syntax element using a first context adaptive binary arithmetic coding (CABAC) context, and wherein coding the second merge mode syntax element comprises coding the second merge mode syntax element using the first CABAC context in response to having coded the first merge mode syntax element using the first CABAC context.

13. The method of claim 12, the first CABAC context being a CABAC context used for merge mode.

14. The method of claim 12, the first CABAC context being different than a second CABAC context used for merge mode.

15. The method of claim 11, wherein coding the first merge mode syntax element comprises coding the first merge mode syntax element using a first context adaptive binary arithmetic coding (CABAC) context, and wherein coding the second merge mode syntax element comprises coding the second merge mode syntax element using a second CABAC context.

16. The method of claim 15, the second CABAC context being different than the first CABAC context.

17. The method of claim 1, further comprising:
coding motion information of a third prediction block using advanced motion vector prediction (AMVP) mode, including coding a motion vector difference (MVD) value having half-luma-sample resolution, the third prediction block being a base inter-prediction block of a neighboring block to the current block; and
coding a candidate index identifying the third prediction block as a motion information candidate for the second prediction block,
wherein generating the second prediction block comprises interpolating half-pixel samples of a reference block for the second prediction block using a six-tap interpolation filter.

18. The method of claim 1, further comprising determining whether to apply local illumination compensation (LIC) to the second prediction block according to whether LIC was applied to the first prediction block.

19. The method of claim 18, wherein the base inter-prediction mode comprises one of uni-directional inter-prediction or bi-directional inter-prediction.

20. The method of claim 18, further comprising applying LIC to the first prediction block, wherein determining whether to apply LIC to the second prediction block comprises determining to apply LIC to the second prediction block in response to having applied LIC to the first prediction block.

21. The method of claim 18, further comprising:
applying LIC to the first prediction block; and
coding motion information for the second prediction block using advanced motion vector prediction (AMVP) mode,
wherein determining whether to apply LIC to the second prediction block comprises determining to apply LIC to the second prediction block in response to applying LIC to the first prediction block and coding the motion information for the second prediction block using AMVP.

22. The method of claim 18, further comprising:
applying LIC to the first prediction block; and
coding motion information for the second prediction block using merge mode,
wherein determining whether to apply LIC to the second prediction block comprises:
coding a LIC flag for a merge candidate of the second prediction block; and
determining whether to apply LIC to the second prediction block according to the value of the LIC flag for the merge candidate of the second prediction block.

23. The method of claim 1, further comprising encoding the current block prior to decoding the current block.

24. A device for decoding video data, the device comprising:
a memory configured to store video data; and
one or more processors implemented in circuitry and configured to:
generate a first prediction block for a current block of video data using a base inter-prediction mode, the first prediction block including first prediction samples for each sample of the current block;
code a merge mode syntax element for a second prediction block, the second prediction block representing an additional prediction hypothesis for the current block, wherein the merge mode syntax element indicates whether motion information for the second prediction block is coded using merge mode;
code motion information for the second prediction block according to the merge mode syntax element, wherein to code the motion information, the one or more processors are configured to, when the merge mode syntax element indicates that the motion information for the second prediction block is coded using merge mode, form a merge candidate list including one or more merge candidates, each of the merge candidates representing respective sets of uni-prediction motion information;
generate the second prediction block for the current block of video data using the motion information, the second prediction block including second prediction samples for each sample of the current block;
form a multi-hypothesis prediction block for the current block as a combination of each of the first prediction samples of the first prediction block and each of the second prediction samples of the second prediction block; and
decode the current block using the multi-hypothesis prediction block.

25. The device of claim 24, wherein to form the merge candidate list, the one or more processors are configured to:
determine that a neighboring block to the second prediction block is bi-predicted using first motion information and second motion information; and form at least one uni-prediction merge candidate from the neighboring block, wherein the one or more processors are configured to select only one of the first motion information or the second motion information for the at least one uni-prediction merge candidate.

26. The device of claim 25, wherein to form the merge candidate list, the one or more processors are configured to:
form a first uni-prediction merge candidate using the first motion information; and
form a second uni-prediction merge candidate using the second motion information.

27. The device of claim 24, wherein the one or more processors are further configured to:
code motion information of a third prediction block using advanced motion vector prediction (AMVP) mode, wherein to code the motion information of the third prediction block, the one or more processors are configured to code a motion vector difference (MVD) value having half-luma-sample resolution, the third prediction block being a base inter-prediction block of a neighboring block to the current block; and
code a candidate index identifying the third prediction block as a motion information candidate for the second prediction block,
wherein to generate the second prediction block, the one or more processors are configured to interpolate half-pixel samples of a reference block for the second prediction block using a six-tap interpolation filter.

28. The device of claim 24, wherein the one or more processors are further configured to determine whether to apply local illumination compensation (LIC) to the second prediction block according to whether LIC was applied to the first prediction block.

29. The device of claim 24, wherein the one or more processors are further configured to encode the current block prior to decoding the current block.

30. The device of claim 24, further comprising a display configured to display the decoded video data.

31. The device of claim 24, wherein the device comprises one or more of a camera, a computer, a mobile device, a broadcast receiver device, or a set-top box.

32. A non-transitory computer-readable storage medium having stored thereon instructions that, when executed, cause a processor to:
generate a first prediction block for a current block of video data using a base inter-prediction mode, the first prediction block including first prediction samples for each sample of the current block;
code a merge mode syntax element for a second prediction block, the second prediction block representing an additional prediction hypothesis for the current block, wherein the merge mode syntax element indicates whether motion information for the second prediction block is coded using merge mode;
code motion information for the second prediction block according to the merge mode syntax element, including, when the merge mode syntax element indicates that the motion information for the second prediction block is coded using merge mode, forming a merge candidate list including one or more merge candidates, each of the merge candidates representing respective sets of uni-prediction motion information;
generate the second prediction block for the current block of video data using the motion information, the second prediction block including second prediction samples for each sample of the current block;
form a multi-hypothesis prediction block for the current block as a combination of each of the first prediction samples of the first prediction block and each of the second prediction samples of the second prediction block; and
decode the current block using the multi-hypothesis prediction block.

33. The non-transitory computer-readable storage medium of claim 32, wherein the instructions that cause the processor to form the merge candidate list comprise instructions that cause the processor to:
determine that a neighboring block to the second prediction block is bi-predicted using first motion information and second motion information; and
form at least one uni-prediction merge candidate from the neighboring block, including instructions that cause the processor to select only one of the first motion information or the second motion information for the at least one uni-prediction merge candidate.

34. The non-transitory computer-readable storage medium of claim 33, wherein the instructions that cause the processor to form the merge candidate list comprise instructions that cause the processor to:
form a first uni-prediction merge candidate using the first motion information; and
form a second uni-prediction merge candidate using the second motion information.

35. The non-transitory computer-readable storage medium of claim 32, further comprising instructions that cause the processor to:
code motion information of a third prediction block using advanced motion vector prediction (AMVP) mode, wherein the instructions that cause the processor to code the motion information of the third prediction block comprise instructions that cause the processor to code a motion vector difference (MVD) value having half-luma-sample resolution, the third prediction block being a base inter-prediction block of a neighboring block to the current block; and
code a candidate index identifying the third prediction block as a motion information candidate for the second prediction block,
wherein the instructions that cause the processor to generate the second prediction block comprise instructions that cause the processor to interpolate half-pixel samples of a reference block for the second prediction block using a six-tap interpolation filter.

36. The non-transitory computer-readable storage medium of claim 32, further comprising instructions that cause the processor to determine whether to apply local illumination compensation (LIC) to the second prediction block according to whether LIC was applied to the first prediction block.

37. The non-transitory computer-readable storage medium of claim 32, further comprising instructions that cause the processor to encode the current block prior to decoding the current block.

38. A device for decoding video data, the device comprising:
means for generating a first prediction block for a current block of video data using a base inter-prediction mode, the first prediction block including first prediction samples for each sample of the current block;
means for coding a merge mode syntax element for a second prediction block, the second prediction block representing an additional prediction hypothesis for the current block, wherein the merge mode syntax element indicates whether motion information for the second prediction block is coded using merge mode;

means for coding motion information for the second prediction block according to the merge mode syntax element, including means for forming, when the merge mode syntax element indicates that the motion information for the second prediction block is coded using merge mode, a merge candidate list including one or more merge candidates, each of the merge candidates representing respective sets of uni-prediction motion information;

means for generating the second prediction block for the current block of video data using the motion information, the second prediction block including second prediction samples for each sample of the current block;

means for forming a multi-hypothesis prediction block for the current block as a combination of each of the first prediction samples of the first prediction block and each of the second prediction samples of the second prediction block; and means for decoding the current block using the multi-hypothesis prediction block.

\* \* \* \* \*